US007880920B2

(12) United States Patent
Akashi

(10) Patent No.: US 7,880,920 B2
(45) Date of Patent: Feb. 1, 2011

(54) IMAGE PROCESSING APPARATUS, IMAGE FORMING APPARATUS, IMAGE FORMING SYSTEM, AND CONTROL METHOD FOR THESE

(75) Inventor: Masamichi Akashi, Funabashi (JP)

(73) Assignee: Canon Kabushiki Kaisha (JP)

( * ) Notice: Subject to any disclaimer, the term of this patent is extended or adjusted under 35 U.S.C. 154(b) by 978 days.

(21) Appl. No.: 11/692,966

(22) Filed: Mar. 29, 2007

(65) Prior Publication Data

US 2007/0230972 A1 Oct. 4, 2007

(30) Foreign Application Priority Data

Mar. 31, 2006 (JP) ............................ 2006-100398

(51) Int. Cl.
*G06F 15/00* (2006.01)
*G06K 1/00* (2006.01)
*G06K 15/00* (2006.01)

(52) U.S. Cl. .................................... 358/1.18; 358/1.13

(58) Field of Classification Search .................. 358/1.1, 358/1.18, 1.15, 1.13, 1.14
See application file for complete search history.

(56) References Cited

U.S. PATENT DOCUMENTS 7,154,629 B2 * 12/2006 Gubo ........................ 358/1.17
2002/0051163 A1 * 5/2002 Fujikura .................... 358/1.12
2007/0214094 A1 * 9/2007 Yokota et al. ................. 705/77

FOREIGN PATENT DOCUMENTS

JP 2005-035229 A 2/2005

* cited by examiner

*Primary Examiner*—Douglas Q Tran
(74) *Attorney, Agent, or Firm*—Rossi, Kimms & McDowell LLP

(57) ABSTRACT

In a system in which a print controller and an image forming apparatus are communicably connected, a first paper information to be used by the print controller and a second paper information to be used by the image forming apparatus are both held in the print controller and the image forming apparatus. The first paper information and the second paper information include a common ID for paper data that corresponds between the first and second paper information. In response to a restore instruction, both sets of the first paper information or both sets of the second paper information are merged. ID duplication is eliminated by changing the IDs in regard to paper data in which IDs are duplicated as a result of merging. The first and second paper information to be used by the print controller and the image forming apparatus are updated based on the result of merging.

17 Claims, 24 Drawing Sheets

FIG. 4

401

| ID | NAME | BASIS WEIGHT | SURFACE PROPERTY | FIXING TEMPERATURE | TRANSFER VOLTAGE |
|---|---|---|---|---|---|
| 0700-0000 | C COMPANY COLOR PLAIN PAPER | 81 | HIGH QUALITY PAPER | 200 | 300 |
| 0701-0000 | C COMPANY COLOR HEAVY PAPER | 157 | HIGH QUALITY PAPER | 210 | 315 |
| 0702-0000 | C COMPANY COATED PAPER | 209 | SINGLE SIDE COAT | 204 | 320 |

F I G. 5

501

| ID | NAME | BASIS WEIGHT | SURFACE PROPERTY | FIXING TEMPERATURE | TRANSFER VOLTAGE |
|---|---|---|---|---|---|
| 0700-0001 | COLOR PLAIN PAPER | 81 | HIGH QUALITY PAPER | 200 | 300 |
| 0702-0001 | COATED PAPER | 209 | SINGLE SIDE COAT | 204 | 320 |

FIG. 6

601

| ID | NAME | BRAND | SIZE | PAPER COLOR | BASIS WEIGHT | TYPE | DETAILED TYPE | FRONT COAT | REAR SIDE COAT | ID INSIDE IMAGE FORMING APPARATUS |
|---|---|---|---|---|---|---|---|---|---|---|
| 1 | COLOR PLAIN PAPER | C COMPANY COLOR PLAIN PAPER | A4 | WHITE | 80gsm | PAPER | Stationery | NONE | NONE | 0700-0001 |
| 2 | COATED PAPER | C COMPANY COLOR HEAVY PAPER | A3 | WHITE | 209gsm | PAPER | Stationery | GLOSSY | NONE | 0702-0001 |

FIG. 15

| INFORMATION | STORAGE LOCATION | VOLUME |
|---|---|---|
| PAPER INFORMATION | SECONDARY STORAGE UNIT | APPROX. 1 Mbyte |
| PRINT SETTINGS INFORMATION | SECONDARY STORAGE UNIT / NON-VOLATILE RAM | APPROX. 1 Mbyte |
| ADDRESS BOOK | SECONDARY STORAGE UNIT | APPROX. SEVERAL Mbyte |
| SAVED DOCUMENT INFORMATION | SECONDARY STORAGE UNIT | APPROX. SEVERAL HUNDRED Mbyte |
| SYSTEM SOFTWARE | SECONDARY STORAGE UNIT | APPROX. SEVERAL TENS OF Mbyte |

FIG. 18A

12'

1801

| ID | NAME | BRAND | SIZE | PAPER COLOR | BASIS WEIGHT | TYPE | DETAILED TYPE | FRONT COAT | REAR SIDE COAT | ID INSIDE IMAGE FORMING APPARATUS |
|---|---|---|---|---|---|---|---|---|---|---|
| 1 | COLOR PLAIN PAPER | C COMPANY COLOR PLAIN PAPER | A4 | WHITE | 80gsm | PAPER | Stationery | NONE | NONE | 0700-0001 |
| 2 | COATED PAPER | C COMPANY COLOR HEAVY PAPER | A3 | WHITE | 209gsm | PAPER | Stationery | GLOSSY | NONE | 0702-0001 |

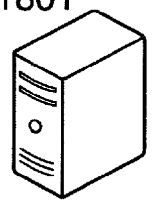

13

1802

| ID | NAME | BRAND | SIZE | PAPER COLOR | BASIS WEIGHT | TYPE | DETAILED TYPE | FRONT COAT | REAR SIDE COAT | ID INSIDE IMAGE FORMING APPARATUS |
|---|---|---|---|---|---|---|---|---|---|---|
| 1 | COLOR PLAIN PAPER | C COMPANY COLOR PLAIN PAPER | A4 | WHITE | 80gsm | PAPER | Stationery | NONE | NONE | 0700-0001 |
| 2 | COATED PAPER | C COMPANY COLOR HEAVY PAPER | A3 | WHITE | 209gsm | PAPER | Stationery | GLOSSY | NONE | 0702-0001 |

1803

| ID | NAME | BASIS WEIGHT | SURFACE PROPERTY | FIXING TEMPERATURE | TRANSFER VOLTAGE |
|---|---|---|---|---|---|
| 0700-0001 | COLOR PLAIN PAPER | 81 | HIGH QUALITY PAPER | 200 | 300 |
| 0702-0001 | COATED PAPER | 209 | SINGLE SIDE COAT | 204 | 320 |

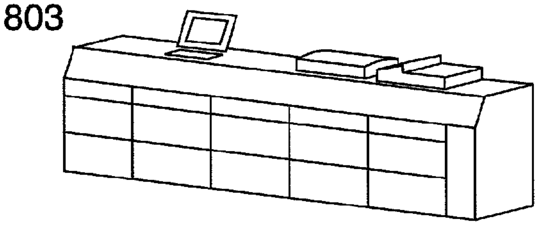

FIG. 18B

1804

| ID | NAME | BRAND | SIZE | PAPER COLOR | BASIS WEIGHT | TYPE | DETAILED TYPE | FRONT COAT | REARSIDE COAT | ID INSIDE IMAGE FORMING APPARATUS |
|---|---|---|---|---|---|---|---|---|---|---|
| 1 | OFFICE PLANNER | C COMPANY COLOR PLAIN PAPER | A4 | WHITE | 80gsm | PAPER | Stationery | NONE | NONE | 0700-0001 |
| 2 | HEAVY PAPER | C COMPANY COLOR HEAVY PAPER | A3 | WHITE | 209gsm | PAPER | Stationery | GLOSSY | NONE | 0701-0001 |

| | ID | NAME | BRAND | SIZE | PAPER COLOR | BASIS WEIGHT | TYPE | DETAILED TYPE | FRONT COAT | REARSIDE COAT | ID INSIDE IMAGE FORMING APPARATUS |
|---|---|---|---|---|---|---|---|---|---|---|---|
| 1805a | 1 | COLOR PLAIN PAPER | C COMPANY COLOR PLAIN PAPER | A4 | WHITE | 80gsm | PAPER | Stationery | NONE | NONE | 0700-0001 |
| 1805 | 2 | COATED PAPER | C COMPANY COLOR HEAVY PAPER | A3 | WHITE | 209gsm | PAPER | Stationery | GLOSSY | NONE | 0702-0001 |
| 1805b | 3 | OFFICE PLANNER | C COMPANY COLOR PLAIN PAPER | A4 | WHITE | 80gsm | PAPER | Stationery | NONE | NONE | 0700-0001 |
| 1805c | 4 | HEAVY PAPER | C COMPANY COLOR HEAVY PAPER | A3 | WHITE | 209gsm | PAPER | Stationery | GLOSSY | NONE | 0701-0001 |

1802

| ID | NAME | BRAND | SIZE | PAPER COLOR | BASIS WEIGHT | TYPE | DETAILED TYPE | FRONT COAT | REARSIDE COAT | ID INSIDE IMAGE FORMING APPARATUS |
|---|---|---|---|---|---|---|---|---|---|---|
| 1 | COLOR PLAIN PAPER | C COMPANY COLOR PLAIN PAPER | A4 | WHITE | 80gsm | PAPER | Stationery | NONE | NONE | 0700-0001 |
| 2 | COATED PAPER | C COMPANY COLOR HEAVY PAPER | A3 | WHITE | 209gsm | PAPER | Stationery | GLOSSY | NONE | 0702-0001 |

1803

| ID | NAME | BASIS WEIGHT | SURFACE PROPERTY | FIXING TEMPERATURE | TRANSFER VOLTAGE |
|---|---|---|---|---|---|
| 0700-0001 | COLOR PLAIN PAPER | 81 | HIGH QUALITY PAPER | 200 | 300 |
| 0702-0001 | COATED PAPER | 209 | SINGLE SIDE COAT | 204 | 320 |

FIG. 18C

12

1806

| ID | NAME | BRAND | SIZE | PAPER COLOR | BASIS WEIGHT | TYPE | DETAILED TYPE | FRONT COAT | REAR SIDE COAT | ID INSIDE IMAGE FORMING APPARATUS |
|---|---|---|---|---|---|---|---|---|---|---|
| 1 | COLOR PLAIN PAPER | C COMPANY COLOR PLAIN PAPER | A4 | WHITE | 80gsm | PAPER | Stationery | NONE | NONE | 0700-0001 |
| 2 | COATED PAPER | C COMPANY COLOR HEAVY PAPER | A3 | WHITE | 209gsm | PAPER | Stationery | NONE | NONE | 0702-0001 |
| 3 | OFFICE PLANNER | C COMPANY COLOR PLAIN PAPER | A4 | WHITE | 80gsm | PAPER | Stationery | NONE | NONE | 0700-0002 |
| 4 | HEAVY PAPER | C COMPANY COLOR HEAVY PAPER | A3 | WHITE | 209gsm | PAPER | Stationery | GLOSSY | NONE | 0701-0001 |

1805b (row 3), 1805c (row 4)

PRINT CONTROLLER B

IMAGE FORMING APPARATUS

13

1807

| ID | NAME | BASIS WEIGHT | SURFACE PROPERTY | FIXING TEMPERATURE | TRANSFER VOLTAGE |
|---|---|---|---|---|---|
| 0700-0001 | COLOR PLAIN PAPER | 81 | HIGH QUALITY PAPER | 200 | 300 |
| 0702-0001 | COATED PAPER | 209 | SINGLE SIDE COAT | 204 | 320 |
| 0700-0002 | OFFICE PLANNER | 80 | HIGH QUALITY PAPER | 200 | 300 |
| 0701-0001 | HEAVY PAPER | 209 | SINGLE SIDE COAT | 204 | 320 |

FIG. 19A

12

PRINT CONTROLLER

1901

| ID | NAME | BRAND | SIZE | PAPER COLOR | BASIS WEIGHT | TYPE | DETAILED TYPE | FRONT COAT | REAR SIDE COAT | ID INSIDE IMAGE FORMING APPARATUS |
|---|---|---|---|---|---|---|---|---|---|---|
| 1 | COLOR PLAIN PAPER | C COMPANY COLOR PLAIN PAPER | A4 | WHITE | 80gsm | PAPER | Stationery | NONE | NONE | 0700-0001 |
| 2 | COATED PAPER | C COMPANY COLOR HEAVY PAPER | A3 | WHITE | 209gsm | PAPER | Stationery | GLOSSY | NONE | 0702-0001 |

1902

| ID | NAME | BASIS WEIGHT | SURFACE PROPERTY | FIXING TEMPERATURE | TRANSFER VOLTAGE |
|---|---|---|---|---|---|
| 0700-0001 | COLOR PLAIN PAPER | 81 | HIGH QUALITY PAPER | 200 | 300 |
| 0702-0001 | COATED PAPER | 209 | SINGLE SIDE COAT | 204 | 320 |

IMAGE FORMING APPARATUS A

13'

1903

| ID | NAME | BASIS WEIGHT | SURFACE PROPERTY | FIXING TEMPERATURE | TRANSFER VOLTAGE |
|---|---|---|---|---|---|
| 0700-0001 | COLOR PLAIN PAPER | 81 | HIGH QUALITY PAPER | 200 | 300 |
| 0702-0001 | COATED PAPER | 209 | SINGLE SIDE COAT | 204 | 320 |

FIG. 19B

12

PRINT CONTROLLER

1901

| ID | NAME | BRAND | SIZE | PAPER COLOR | BASIS WEIGHT | TYPE | DETAILED TYPE | FRONT COAT | REAR SIDE COAT | ID INSIDE IMAGE FORMING APPARATUS |
|---|---|---|---|---|---|---|---|---|---|---|
| 1 | COLOR PLAIN PAPER | C COMPANY COLOR PLAIN PAPER | A4 | WHITE | 80gsm | PAPER | Stationery | NONE | NONE | 0700-0001 |
| 2 | COATED PAPER | C COMPANY COLOR HEAVY PAPER | A3 | WHITE | 209gsm | PAPER | Stationery | GLOSSY | NONE | 0702-0001 |

1902

| ID | NAME | BASIS WEIGHT | SURFACE PROPERTY | FIXING TEMPERATURE | TRANSFER VOLTAGE |
|---|---|---|---|---|---|
| 0700-0001 | COLOR PLAIN PAPER | 81 | HIGH QUALITY PAPER | 200 | 300 |
| 0702-0001 | COATED PAPER | 209 | SINGLE SIDE COAT | 204 | 320 |

13

IMAGE FORMING APPARATUS B

1904

| ID | NAME | BASIS WEIGHT | SURFACE PROPER-TY | FIXING TEMPER-ATURE | TRANS-FER VOLTAGE |
|---|---|---|---|---|---|
| 0700-0001 | OFFICE PLAN-NER | 66 | HIGH QUALITY PAPER | 200 | 300 |
| 0701-0001 | HEAVY PAPER | 157 | HIGH QUALITY PAPER | 210 | 315 |

1905

| ID | NAME | BASIS WEIGHT | SURFACE PROPER-TY | FIXING TEMPER-ATURE | TRANS-FER VOLTAGE |
|---|---|---|---|---|---|
| 0700-0001 | OFFICE PLAN-NER | 66 | HIGH QUALITY PAPER | 200 | 300 |
| 0701-0001 | HEAVY PAPER | 157 | HIGH QUALITY PAPER | 210 | 315 |
| 0700-0001 | COLOR PLAIN PAPER | 81 | HIGH QUALITY PAPER | 200 | 300 |
| 0702-0001 | COATED PAPER | 209 | SINGLE SIDE COAT | 204 | 320 |

1905a

1905b

FIG. 19C

12

1907

| ID | NAME | BRAND | SIZE | PAPER COLOR | BASIS WEIGHT | TYPE | DETAILED TYPE | FRONT COAT | REAR SIDE COAT | ID INSIDE IMAGE FORMING APPARATUS |
|---|---|---|---|---|---|---|---|---|---|---|
| 1 | OFFICE PLANNER | C COMPANY COLOR PLAIN PAPER | A4 | WHITE | 80gsm | PAPER | Stationery | NONE | NONE | 0700-0001 |
| 2 | HEAVY PAPER | C COMPANY COLOR HEAVY PAPER | A3 | WHITE | 209gsm | PAPER | Stationery | NONE | NONE | 0701-0001 |
| 3 | COLOR PLAIN PAPER | C COMPANY COLOR PLAIN PAPER | A4 | WHITE | 80gsm | PAPER | Stationery | NONE | NONE | 0700-0002 |
| 4 | COATED PAPER | C COMPANY COLOR HEAVY PAPER | A3 | WHITE | 209gsm | PAPER | Stationery | GLOSSY | NONE | 0702-0001 |

PRINT CONTROLLER

IMAGE FORMING APPARATUS B

13

1906

| ID | NAME | BASIS WEIGHT | SURFACE PROPERTY | FIXING TEMPERATURE | TRANSFER VOLTAGE |
|---|---|---|---|---|---|
| 0700-0001 | OFFICE PLANNER | 66 | HIGH QUALITY PAPER | 200 | 300 |
| 0701-0001 | HEAVY PAPER | 157 | HIGH QUALITY PAPER | 210 | 315 |
| 0700-0002 | COLOR PLAIN PAPER | 81 | HIGH QUALITY PAPER | 200 | 300 |
| 0702-0001 | COATED PAPER | 209 | SINGLE SIDE COAT | 204 | 320 |

IMAGE PROCESSING APPARATUS, IMAGE FORMING APPARATUS, IMAGE FORMING SYSTEM, AND CONTROL METHOD FOR THESE

BACKGROUND OF THE INVENTION

1. Field of the Invention

The present invention relates to information management in image forming systems containing an image forming apparatus and an image processing apparatus.

2. Description of the Related Art

Conventionally, image forming systems are known in which a client PC and an image forming apparatus are connected via a network and print jobs are sent from the client PC via the network to the image forming apparatus to carry out printing. With this type of system, a configuration is well known in which a print controller, which carries out management and the like of print jobs that are sent in from the client PC via the network, is provided between the client PC and the image forming apparatus. For example, there is a form as shown in FIG. 1 in which an image forming apparatus 13 connects to a network 16 via a print controller 12. This configuration releases the image forming apparatus from managing print jobs and other burdens.

Since the print controller and the image forming apparatus in the above-described image forming system are independent apparatuses, cases arise in which one or the other of these is to be replaced. It is desirable that various conditions for which settings have been made up until then (for example, paper information defined by a user) can be passed on to the replacement device. For this reason, image forming systems generally have a function for backing up information.

An example of a backup in image forming apparatuses is a backup of information in the system and an SRAM, which is basically carried out by service personnel using tools intended for service personnel. Another well-known configuration is one that can be carried out whenever required by the user on the client PC, wherein a backup can be made of documents and address book information saved within the image forming apparatus. Furthermore, there is another configuration in which a backup function in the print controller is started up from a print controller management application installed on the client PC, thereby enabling backup of system and telephone book information and the like. Also, JP 2005-035229A describes regularly backing up important information on a printer control board to a controller.

However, a restore process of recovering information that was backed up using the above-described backup function involves simply copying the backed up state to the print controller or the image forming apparatus. Consequently, with an ordinary restore process, information is set in the state of when either the image forming apparatus or the print controller was backed up, which gives rise to problems such as the following.

For example, with a system in which the print controller is connected to the image forming apparatus, a configuration is achieved in which information defined by the user is held and this is used to enable processing for image formation. Paper information is a typical example of such user-defined information. The print controller and the image forming apparatus hold paper information created by the user. Paper information that is generated by the user and held in the print controller includes information that cannot be used in engine control of the image forming apparatus such as information (brand names) and the like that is shown to enable user selection of paper and the like. On the other hand, the image forming apparatus holds information (parameters such as fixing temperature) for controlling the image forming apparatus (for example, the print engine) in accordance with the above-mentioned paper information that is held by the print controller. A common ID is conferred between the print controller and the image forming apparatus to each set of paper data contained in the respective paper information of the print controller and the image forming apparatus. In this way, correct paper and printing parameters can be selected by instructions from the print controller.

As mentioned earlier, under such conditions there are times when a different print controller is to be connected to the image forming apparatus such as when the print controller has broken down. In this case, the associations between the paper information of the print controller and the image forming apparatus become inappropriate if the reconnection is simply performed as is. In this case, when paper to be used is selected by referencing the paper information of the print controller, a different paper may end up being used on the image forming apparatus side, and printing will not be able to be carried out using the paper intended by the user. Furthermore, if the data of the paper information for the print controller is backed up in the image forming apparatus, it will be possible to return to the state that was backed up. However, the print controller returns to the state of the time when the image forming apparatus made the backup, and there is a possibility that paper information necessary to the user will be lost. For example, when the print controller possesses paper information that was set in a previous environment, that paper information may end up being deleted and it will be impossible to make use of it.

SUMMARY OF THE INVENTION

The present invention has been devised in light of these issues. The present invention provides an image forming system, in which an image processing apparatus and an image forming apparatus are connected, and which appropriately maintains paper information that was used in the image processing apparatus or the image forming apparatus prior to a replacement when a replacement of the image processing apparatus or a replacement of the image forming apparatus occurs.

According to one aspect of the present invention, there is provided an image forming system, in which an image forming apparatus and an image processing apparatus that sends image data to the image forming apparatus are communicably connected, comprising: a first holding unit configured to hold in the image processing apparatus both a first paper information to be used in the image processing apparatus and a second paper information to be used in the image forming apparatus; a second holding unit configured to hold in the image forming apparatus both the first paper information and the second paper information, wherein the first paper information and the second paper information include data for each paper respectively, and a common identifier is conferred to paper data that corresponds between the first and second paper information; a merging unit configured to, when the image processing apparatus has been replaced by a new image processing apparatus, merge the first paper information held in the second holding unit and the first paper information held in the new image processing apparatus and, when the image forming apparatus has been replaced by a new image forming apparatus, merge the second paper information held in the first holding unit and the second paper information held in the new image forming apparatus; a change unit configured to change an identifier in regard to paper data in which identifiers are duplicated as a result of merging by the merging unit so as to eliminate duplication of identifiers; an update unit configured to update the first paper information to be used by the new image processing apparatus and the second paper information to be used by the new image forming apparatus based on a merging result obtained by the merging unit and the change unit, and a selecting unit configured to select, based on the identifier that is sent with image data by the image processing apparatus and the updated second paper information, paper to be used in carrying out image forming according to image data using the image forming apparatus.

Furthermore, according to another aspect of the present invention, there is provided an image processing apparatus connectable to an image forming apparatus in which both a first paper information to be used in the image processing apparatus and a second paper information to be used in the image forming apparatus are held, wherein the first paper information and the second paper information include data for each paper respectively, and a common identifier is conferred to paper data that corresponds between the first and second paper information, comprising: an obtaining unit configured to obtain the first paper information from the image forming apparatus; a merging unit configured to merge the first paper information obtained by the obtaining unit and the first paper information being held by itself; a change unit configured to change an identifier when duplication of identifiers has occurred in the first paper information obtained by the merging unit so as to eliminate duplication of identifiers; an update unit configured to update the first paper information based on a merging result obtained by the merging unit and the change unit, and a sending unit configured to send image data to the image forming apparatus along with the identifier conferred to the updated first paper information by the update unit, the image data being used in image forming by the image forming apparatus.

Furthermore, according to another aspect of the present invention, there is provided an image forming apparatus connectable to an image processing apparatus in which both a first paper information to be used in the image processing apparatus and a second paper information to be used in the image forming apparatus are held, wherein the first paper information and the second paper information include data for each paper respectively, and a common identifier is conferred to paper data that corresponds between the first and second paper information, comprising: an obtaining unit configured to obtain the second paper information from the image processing apparatus; a merging unit configured to merge the second paper information obtained by the obtaining unit and the second paper information being held by itself; a change unit configured to change an identifier when duplication of identifiers has occurred in the second paper information obtained by the merging unit so as to eliminate duplication of identifiers; an update unit configured to update the second paper information based on a merging result obtained by the merging unit and the change unit, and a selecting unit configured to select, based on the identifier that is sent with image data by the image processing apparatus and the updated second paper information, paper to be used in carrying out image forming according to image data using the image forming apparatus.

Furthermore, according to another aspect of the present invention, there is provided a control method for an image forming system, in which an image forming apparatus and an image processing apparatus that sends image data to the image forming apparatus are communicably connected, the method comprising: a first holding step of holding in a first holding means of the image processing apparatus both a first paper information to be used in the image processing apparatus and a second paper information to be used in the image forming apparatus; a second holding step of holding in a second holding means of the image forming apparatus both a first paper information to be used in the image processing apparatus and a second paper information to be used in the image forming apparatus, wherein the first paper information and the second paper information include data for each paper respectively, and a common identifier is conferred to paper data that corresponds between the first and second paper information; a merging step of, when the image processing apparatus has been replaced by a new image processing apparatus, merging the first paper information being held in the second holding means and the first paper information held in the new image processing apparatus and, when the image forming apparatus has been replaced by a new image forming apparatus, merging the second paper information being held in the first holding means and the second paper information held in the new image forming apparatus; a change step of changing an identifier in regard to paper data in which identifiers are duplicated as a result of merging in the merging step so as to eliminate duplication of identifiers; an update step of updating the first paper information to be used by the new image processing apparatus and the second paper information to be used by the new image forming apparatus based on a merging result obtained by the merging step and the change step; and a selecting step of selecting, based on the identifier that is sent with image data by the image processing apparatus and the updated second paper information, paper to be used in carrying out image forming according to image data using the image forming apparatus.

Furthermore, according to another aspect of the present invention, there is provided a control method for an image processing apparatus connectable to an image forming apparatus in which both a first paper information to be used in the image processing apparatus and a second paper information to be used in the image forming apparatus are held, wherein the first paper information and the second paper information include data for each paper respectively, and a common identifier is conferred to paper data that corresponds between the first and second paper information, the method comprising: an obtaining step of obtaining the first paper information from the image forming apparatus; a merging step of merging the first paper information obtained by the obtaining step and the first paper information being held by itself; a change step of changing an identifier when duplication of identifiers has occurred in the first paper information obtained by the merging step so as to eliminate duplication of identifiers; an update step of updating the first paper information based on a merging result obtained by the merging step and the change step; and a sending step of sending image data to the image forming apparatus along with the identifier conferred to the updated first paper information by the update step, the image data being used in image forming by the image forming apparatus.

Furthermore, according to another aspect of the present invention, there is provided a control method for an image forming apparatus connectable to an image processing apparatus in which both a first paper information to be used in the image processing apparatus and a second paper information to be used in the image forming apparatus are held, wherein the first paper information and the second paper information include data for each paper respectively, and a common identifier is conferred to paper data that corresponds between the first and second paper information, the method comprising: an obtaining step of obtaining the second paper information from the image processing apparatus; a merging step of merging the second paper information obtained by the obtaining step and the second paper information being held by itself; a change step of changing an identifier when duplication of identifiers has occurred in the second paper information obtained by the merging step so as to eliminate duplication of identifiers; an update step of updating the second paper information based on a merging result obtained by the merging step and the change step; and a selecting step of selecting, based on the identifier that is sent with image data by the image processing apparatus and the updated second paper information, paper to be used in carrying out image forming according to image data using the image forming apparatus.

Furthermore, according to another aspect of the present invention, there is provided an image forming system having an image processing apparatus and an image forming apparatus that performs image forming processing based on image data sent from the image processing apparatus; wherein the image processing apparatus comprises: a first holding unit configured to store a first paper information including at least identification information identifying paper to be used in the image forming processing and processing condition information indicating a processing condition of when image forming processing is executed using the paper; and a sending unit configured to send the first paper information held in the first holding unit to the image forming apparatus, wherein the image forming apparatus comprises: a second holding unit configured to hold a second paper information including at least identification information identifying paper to be used in the image forming processing and processing condition information indicating a processing condition of when image forming processing is executed using the paper; a receiving unit configured to receive the first paper information sent by the sending unit; a control unit configured to control such that, when identification information contained in the first paper information and identification information contained in the second paper information are duplicated, duplicated identification information is changed and a third paper information in which the first paper information and the second paper information are merged is held in the second holding unit; a selection unit configured to select paper to be used in the image forming apparatus based on identification information sent with image data by the image processing apparatus and the third paper information; and a printing unit configured to carry out image forming processing based on the image data according to the processing condition information corresponding to the paper selected by the selection unit.

Further features of the present invention will become apparent from the following description of exemplary embodiments with reference to the attached drawings.

BRIEF DESCRIPTION OF THE DRAWINGS

FIG. 4 shows one example of original data in the image forming apparatus.

FIG. 5 shows one example of user-defined data in the image forming apparatus.

FIG. 6 shows one example of paper data in the print controller.

FIG. 15 shows an example of information targeted for backup processing in a fourth embodiment.

FIGS. 18A to 18C are diagrams for describing elimination of duplicated IDs in the image forming apparatus during a restore process at a time of replacing a print controller.

FIGS. 19A to 19C are diagrams for describing elimination of duplicated IDs in the image forming apparatus during a restore process at a time of replacing an image forming apparatus.

DESCRIPTION OF THE EMBODIMENTS

Preferred embodiments of the present invention will now be described in detail in accordance with the accompanying drawings.

First Embodiment

[System Configuration]

Figure 1:
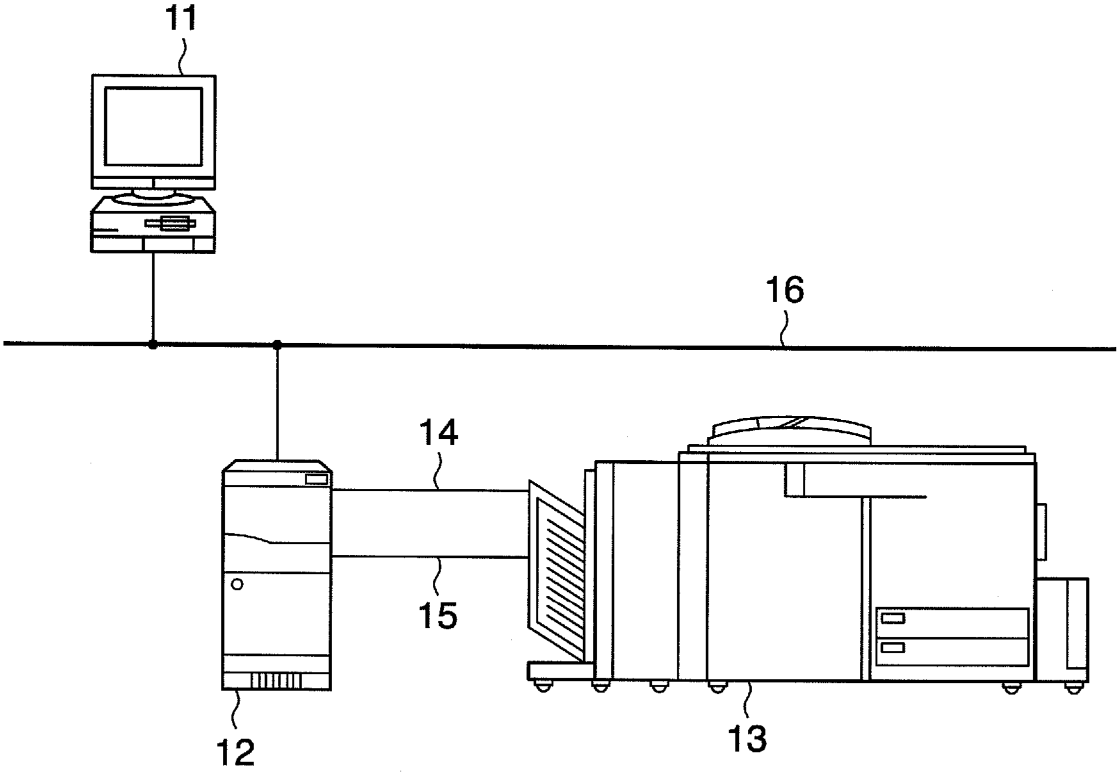
FIG. 1 shows a configuration example of an image forming system according to a first embodiment.

FIG. 1 shows a configuration example of a print system according to a first embodiment. As shown in FIG. 1, the print system is provided with a client PC 11, an image forming apparatus 13, a print controller 12 connected to the image forming apparatus 13, and a network 16. The client PC 11 and the print controller 12 are communicably connected by the network 16. Furthermore, the print controller 12 and the image forming apparatus 13 are communicably connected by a local network 14. Further still, the print controller 12 transfers image data as video signals via a dedicated I/F cable 15. The print controller 12 creates virtual printers and hot folders so as to enable printing by specifying a paper desired to be used. By dropping a job in the client PC 11 onto the virtual printer or hot folder that is set for the paper desired to be used, a user is able to print the job using the specified paper.

[Configuration of Image Forming Apparatus 13]

Figure 2:
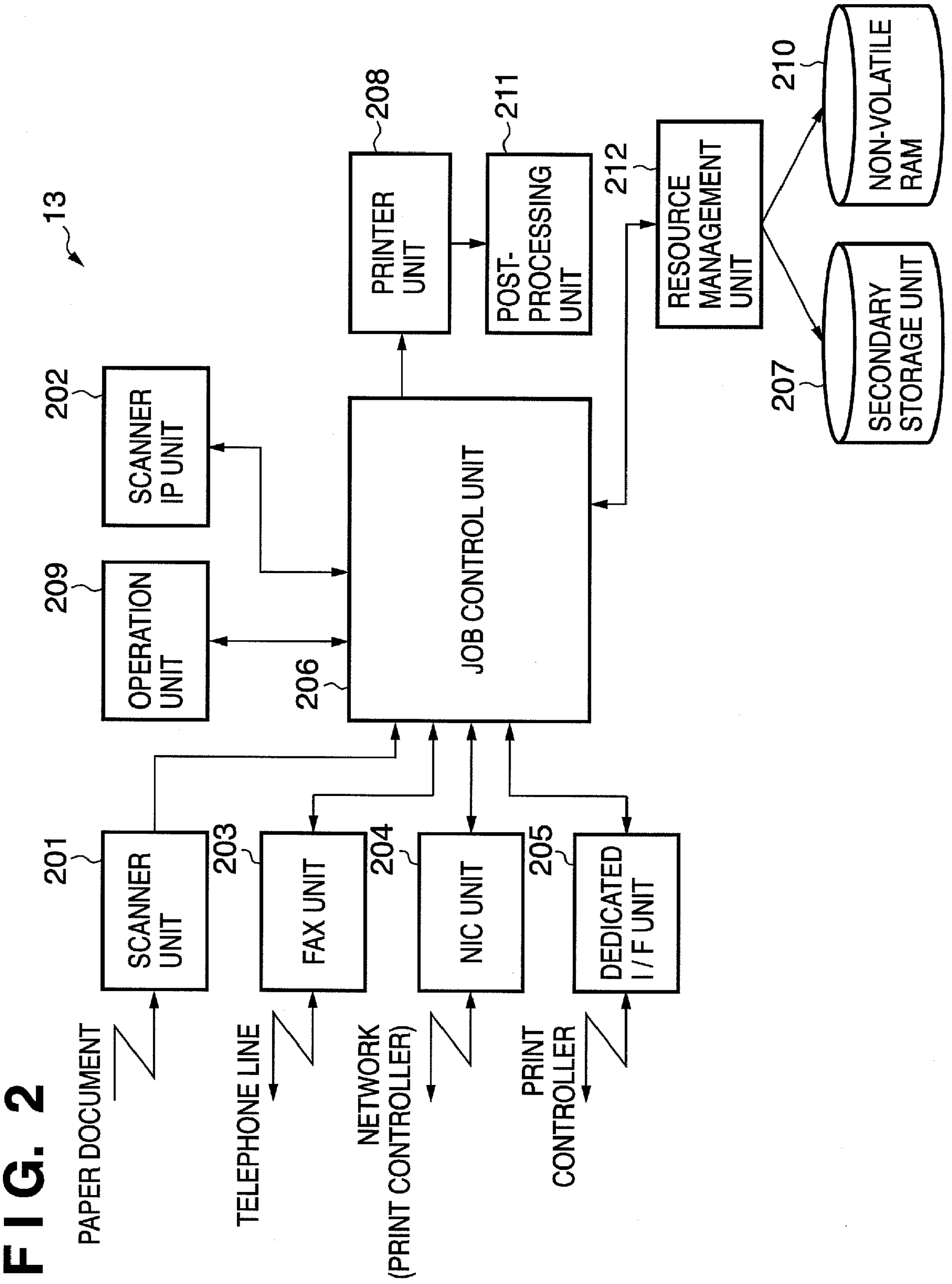
FIG. 2 is a block diagram showing a configuration example of an image forming apparatus.

FIG. 2 is a block diagram showing a configuration example of the image forming apparatus 13 according to the first embodiment. In FIG. 2, a scanner unit 201 carries out image reading and a scanner IP unit 202 performs image processing on image data obtained by the scanner unit 201. A FAX unit 203 sends/receives images using telephone lines as typical of facsimile machines and the like. An NIC (network interface card) unit 204 handles exchanges of device information with the print controller 12 via the local network 14. A dedicated I/F unit 205 receives video signals from the print controller 12 via the dedicated I/F cable 15 and carries out information exchange with the print controller 12.

A job control unit 206 is provided with an unshown CPU and memory, and various types of control of the image forming apparatus 13 are achieved by having the CPU execute control programs stored in the memory. For example, control is performed for temporarily saving image signals and determining transfer destinations of the image signals. It should be noted that the job control unit 206 stores various types of data such as image data and control information and the like using a secondary storage unit 207 such as a hard disk or the like capable of storing multiple sets of image data. For example, image data from the scanner unit 201 and image data of facsimile jobs inputted via the FAX unit 203 are stored in the secondary storage unit 207. Or control information inputted via the NIC unit 204 from the print controller 12 and image data inputted via the dedicated I/F unit 205 from the print controller 12 is stored in the secondary storage unit 207. In this way, the job control unit 206 stores a plurality of types of image data in the secondary storage unit 207, reads out as required the image data that has been stored in the secondary storage unit 207, and carries out transfer to an output unit such as a printer unit 208. Thus, the job control unit 206 carries out print processing on image data using the printer unit 208. Furthermore, the job control unit 206 is capable of transferring to an external device such as another computer or an image forming apparatus the image data that has been read out from the secondary storage unit 207 due to instruction from an operator inputted via an operation unit 209.

The image forming apparatus 13 has a function of being able to save printing apparatus control information for each type of sheet. When an ordinary user is to use a new paper, the paper to be used is selected from a list of original papers held as uneditable information and this is copied to a user-defined data area, then fine adjustments are made such as changes to the name and changes to the printing apparatus control settings. In the present embodiment, user-defined paper information is used as user-defined data. In the present embodiment, the job control unit 206 generates a paper information database and adds, edits, and deletes paper information specified by the user in accordance with instruction input from the operation unit 209 or instruction information from the print controller 12 through the NIC unit 204.

A post-processing unit 211 performs post-processing such as binding on printing media that have undergone print processing by the printer unit 208. A resource management unit 212 manages the secondary storage unit 207 and a non-volatile RAM 210.

[Configuration of Print Controller 12]

Figure 3:
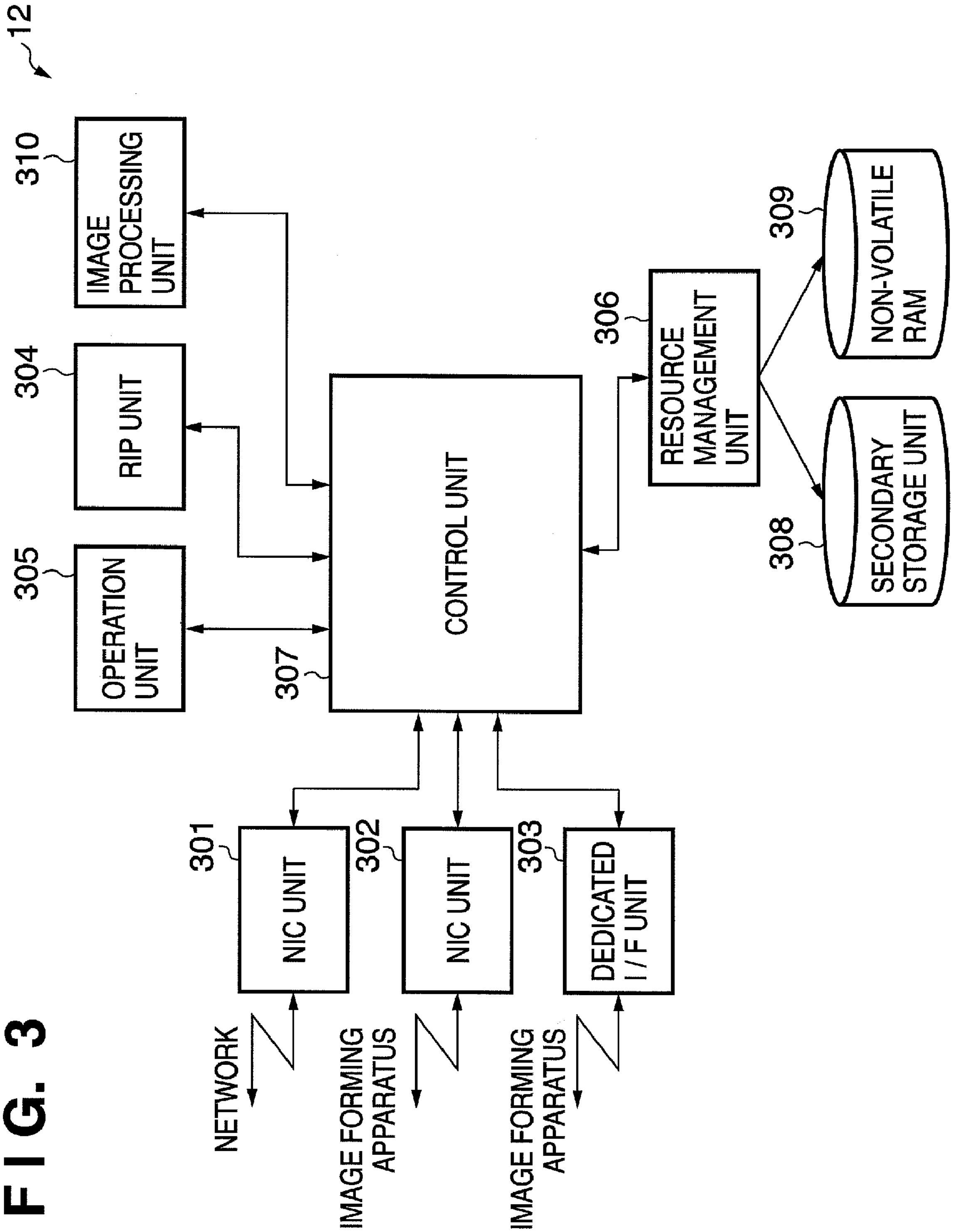
FIG. 3 is a block diagram showing a configuration example of a print controller.

FIG. 3 is a block diagram showing a configuration example of the print controller 12 in the first embodiment. An NIC unit 301 is connected to the network 16 and makes possible communication with the client PC 11. Also, an NIC unit 302 that connects to the local network 14 makes possible exchanges of information with the image forming apparatus 13. A dedicated I/F unit 303 sends images (video signals) that have been ripped by a RIP unit 304 to the image forming apparatus 13 via the dedicated I/F cable 15. An operation unit 305 provides an interface for the user to carry out paper information operations and the like. The RIP unit 304 rips print jobs that have been sent from a client PC via the network 16. In the ripping of a print job by the RIP unit 304, the image processing unit 310 executes various types of image processing so as to enable formation of an image intended by the user. A resource management unit 306 manages various resources. A control unit 307 of the print controller 12 is provided with an unshown CPU and memory, and achieves various types of control in the print controller 12 by having the CPU execute control programs stored in the memory.

The resource management unit 306 manages a secondary storage unit 308 and a non-volatile RAM 309. Furthermore, the control unit 307 generates a paper information database in the secondary storage unit 308 managed by the resource management unit 306 and manages the user-defined data (for example, user-defined paper information) in the print controller 12. Adding, editing, and deleting of paper information specified by the user is made possible by input from the operation unit 305 and external control via the NIC units 301 and 302.

[Paper Information in the Image Forming Apparatus 13]

The following is a description of an embodiment in which paper information is used as original data and user-defined data. FIGS. 4 and 5 are an example of original data and user-defined data in the image forming apparatus 13. FIG. 4 shows one example of original data that is stored without being edited in the image forming apparatus 13. FIG. 5 shows one example of user-defined data. Hereinafter, original data 401 may be referred to as original paper information 401 and user-defined data 501 may be referred to as user-defined paper information 501. Furthermore, each set of paper information is constituted by a plurality of sets of paper data.

In the original paper information 401 and the user-defined paper information 501, an "ID" has a data length of four bytes, wherein the first two bytes are an original ID and the lower order two bytes are an identifier defined as a local ID. "Original ID" refers to IDs that are managed such that all managed papers have a unique ID and so that the same paper has the same ID regardless of which model it is on. On the other hand, "local ID" indicates an ID that is unique only within a single device. Furthermore, the lower order two bytes of ID in the original data are always "0000" and the user-defined data is "0001" or higher. According to an ID conferring method of the present embodiment, the first two bytes of the user-defined data prescribes the original data on which that data is based. For example, it is evident that paper data having an ID=0700-0001 of user-defined paper information 501 was generated based on original data of ID=0700-0000.

In the original paper information 401, "name" refers to the name of the paper, in which a brand name is registered including types of paper such as plain paper, heavy paper, and coated paper for example. In the user-defined paper information 501, names that have been edited by the user are recorded in the "name" column. In the examples of FIG. 5, the item "C company color plain paper" in the original paper information 401 is indicated in a circumstance in which its name has been changed to "color plain paper."

"Basis weight," "surface property," "fixing temperature," and "transfer voltage" indicates information that is used as parameters when the printer unit 208 of the image forming apparatus 13 carries out printing. These sets of information can be set by the user to desired values with regard to the original paper information.

Ordinarily, original paper information cannot be changed except by service personnel. When a user is to change a name or engine parameter of original paper information that has been preset, he does not directly edit the original paper information, but rather copies it to a data area as paper data of the user-defined paper information 501 shown in FIG. 5 and performs editing there. It should be noted that the original paper information 401 is recorded on an unshown ROM inside the image forming apparatus 13. Furthermore, in the present embodiment, the user-defined paper information 501, which includes paper information that has been set by the user, is recorded on an unshown RAM inside the job control unit 206 and backup-saved in the secondary storage unit 207. Of course, the original paper information 401 may also be saved in a secondary storage unit.

[Paper Information in the Print Controller 12]

FIG. 6 shows a data structure example of user-defined paper information 601 in the print controller 12. As shown in FIG. 6, the print controller 12 confers a unique ID (identifier) to each set of paper data and manages the paper information in a format different from the image forming apparatus 13. There are two "names," these being a name that the user can freely apply and a brand name. Using these names enables a user interface to be provided that makes it easier for the user to recognize paper types. Furthermore, settings can be made such as the "type," "detailed type," "front coat," and "rear side coat" of the paper and these include information making it easier for the user to select paper. Further still, with the user-defined paper information 601, "ID"s in the image forming apparatuses 13 are saved, and with these the paper information in the print controller 12 and the paper information in the image forming apparatus 13 are associated. It should be noted that in the present embodiment, the user-defined paper information 501, which includes paper information that has been set by the user, is recorded and used on an unshown RAM inside the control unit 307 (a RAM and a secondary storage unit may be used together) and backup-saved in a secondary storage unit 308.

[Process when Paper Data Registration/Changes are Carried Out at the Image Forming Apparatus]

Figure 7A:
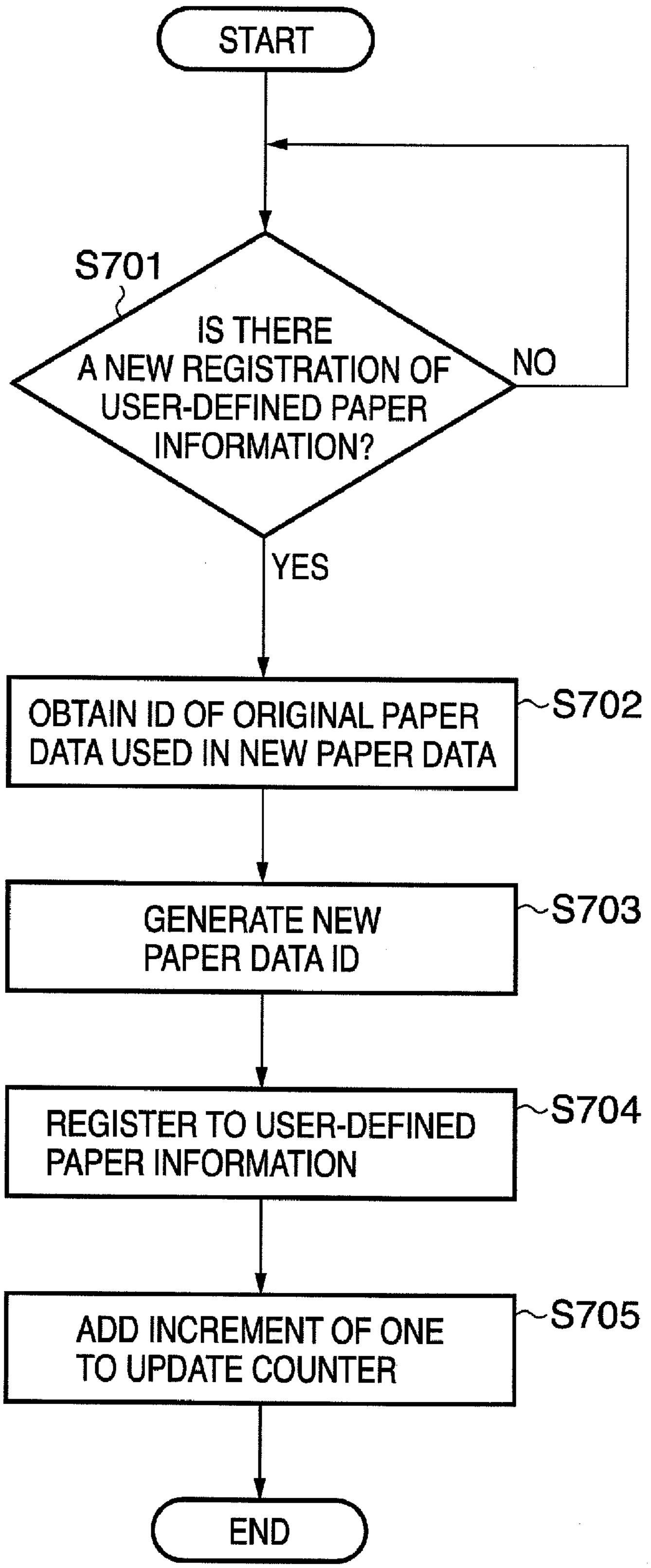
FIG. 7A is a flowchart showing a process of updating (registering/changing) paper information in the image forming apparatus.
Figure 7B:
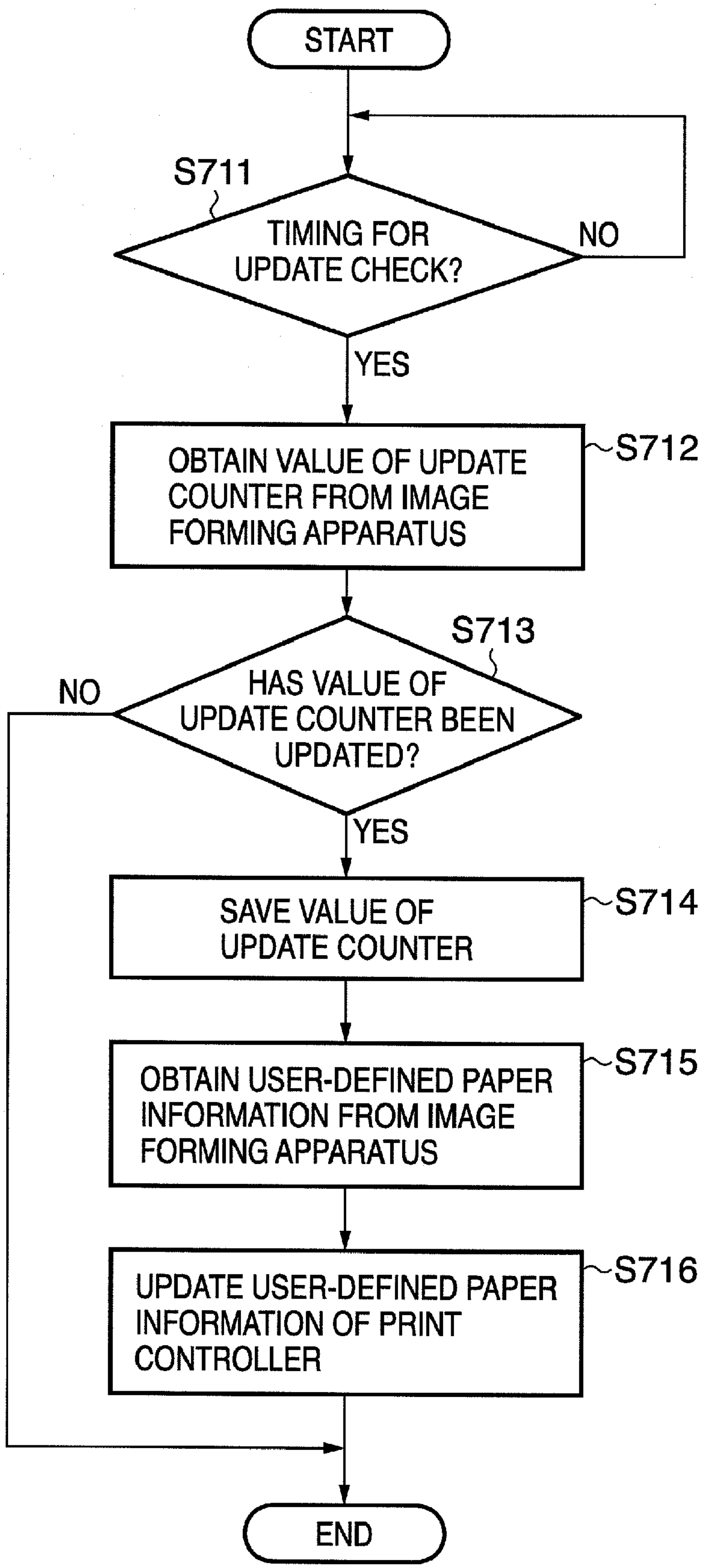
FIG. 7B is a flowchart for describing a process in which the print controller reflects an update of paper information in the image forming apparatus.

Next, description is given of a process from when new paper data (paper data to be added to the user-defined paper information) is registered in the image forming apparatus 13 by a user using the operation unit 209 until the addition of the new paper data is reflected in the print controller 12. FIG. 7A is a flowchart for describing a process of registering new paper data in the image forming apparatus 13. FIG. 7B is a flowchart for describing a process in which new paper data that has been registered in the image forming apparatus is reflected in the print controller 12.

At step S701, the job control unit 206 of the image forming apparatus 13 detects that a request to register new paper data has been made by the operation unit 209, which starts the registration process from step S702 onward. At step S702, the job control unit 206 obtains the ID of the paper data in the original paper information 401 that was used in setting the new paper information. In the present embodiment, new paper data defined by the user is created by changing settings values of paper data based on predetermined paper data from the original paper information 401. At step S702, the ID of the original paper data that was used in creating the new paper data is obtained. It should be noted that this may also be configured so that paper data to be used as a base for newly defining paper data is selectable by the user from the original paper information. In this case, the ID of the selected original paper data is obtained in step S702.

Next, at step S703, the job control unit 206 generates a new paper data ID based on the ID that was obtained at step S702. As described above, a two-byte local ID is connected to the first two bytes of the ID of the original data to generate a four-byte ID. Following this at step S704 the job control unit 206 uses the above-described generated ID to register the above-described newly generated paper data in the user-defined paper information 501. As described above, the user-defined paper information 501 is held in a RAM (unshown) of the job control unit 206, and additional registrations of paper data are also carried out on this RAM. Paper data that has been added to the RAM is recorded as appropriate in the secondary storage unit 207. Then, at step S705, the job control unit 206 adds an increment of one to an update counter. Furthermore, the update counter is also set on the RAM of the job control unit 206.

On the other hand, with a preset timing, the control unit 307 of the print controller 12 checks for an update of the user-defined paper information 501 in the image forming apparatus 13 and when an update is detected, it updates its own user-defined paper information 601 in accordance with the update.

First, at step S711, a determination is made as to whether or not it is the timing for an update check. The timing for an update check may be set for example at each time a predetermined time has elapsed. When it is determined that it is the timing for an update check, the control unit 307 obtains the value of the update counter from the image forming apparatus 13 in step S712 then determines at step S713 whether or not the update counter has been changed since the previous check timing. If the update counter has been changed, the control unit 307 saves the value of the update counter at step S714. Then, at step S715, the user-defined paper information 501 is obtained from the image forming apparatus 13. Then, at step S716, the user-defined paper information of the print controller 12 is updated based on the user-defined paper information 501 obtained at step S715. That is, the new paper data included in the user-defined paper information 501 is added to the user-defined paper information 601 of the print controller.

It should be noted that in the present embodiment the control unit 307 obtains all the user-defined paper information 501 held by the image forming apparatus 13 and detects the update status thereof to update the user-defined paper information 601, but there is no limitation to this. This may also be configured by notifying the print controller 12 of new paper data in the user-defined paper information 501 updated by the image forming apparatus 13, and having the print controller 12 update the user-defined paper information 601 in response to this notification.

When it is determined there is no change in the update counter at step S713, this means there has been no change in the user-defined paper information in the image forming apparatus 13 and therefore processing finishes without executing the update processes from step S714 onward. Then, at step S711, the procedure stands by for the next timing for an update check.

It should be noted that processing is carried out in a same manner as above when a change has been carried out in the paper data registered in the user-defined paper information in the image forming apparatus 13. That is, the image forming apparatus 13 incrementally adds to the update counter when paper data defined by the user has been changed. Then, the print controller 12 detects change in the user-defined paper information by detecting change in the update counter and the user-defined paper information is updated by the process that was described using FIG. 7B. It should be noted that when paper data is to be changed, the paper data is selected from the user-defined paper information 501. Accordingly, content that can be changed are data items (name, basis weight, surface properties, fixing temperature, and transfer voltage) provided in the user-defined paper information 501. Of course, it is also possible to configure this by obtaining registered content of corresponding paper data in the print controller from the ID of the selected paper data and making it possible to change "detailed type" and "front coat" and the like.

[Process when Paper Data Registration is Carried Out at the Print Controller]

Figure 8:
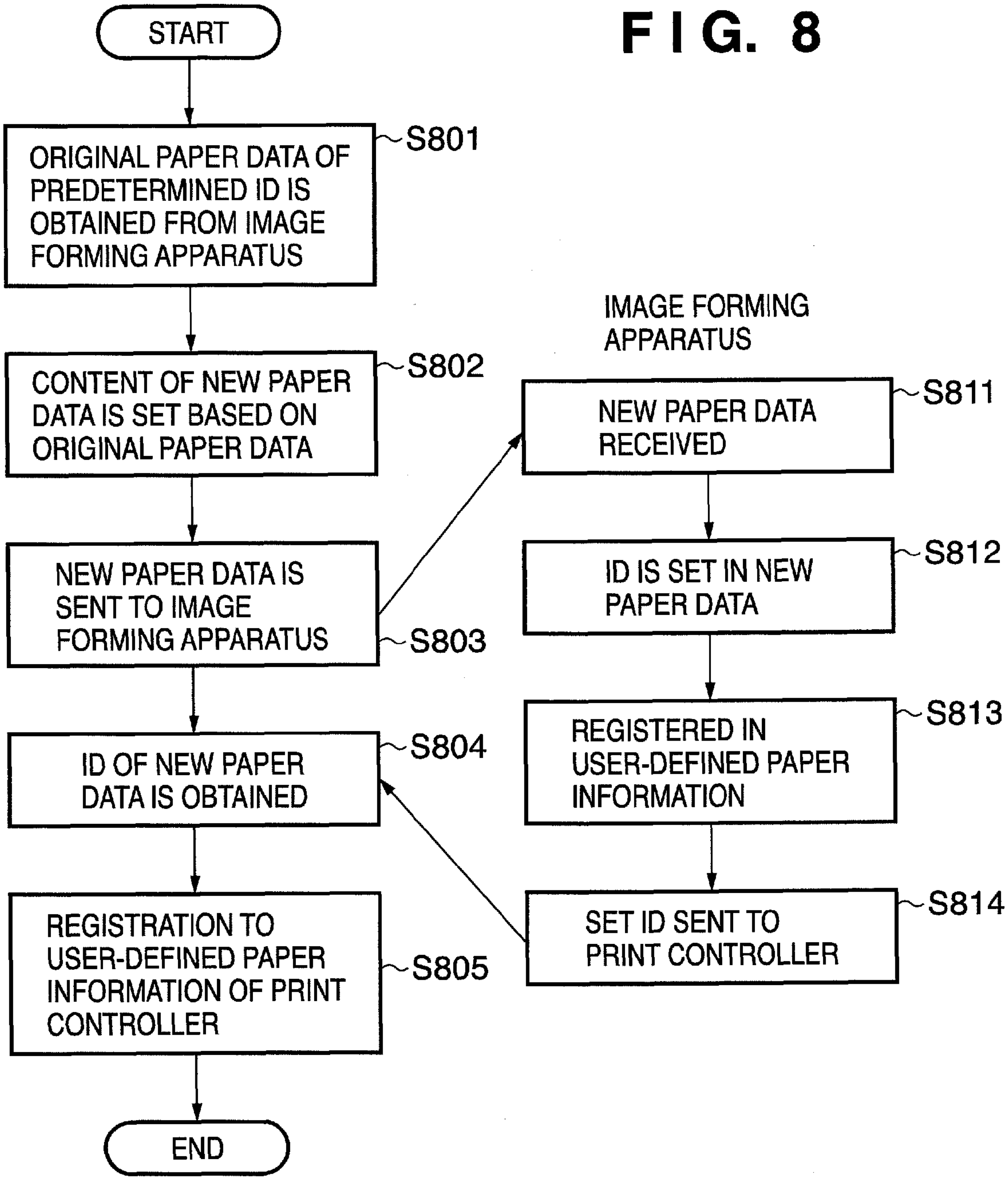
FIG. 8 is a flowchart for describing a process when paper information from the print controller is registered.

Next, the flowchart of FIG. 8 is used to describe a process flow when new paper data is to be registered in the print controller 12.

First, the user carries out registration of new paper data from the user interface provided on the print controller 12. The user interface provided on the print controller 12 is shown to the user through a client PC 11 for example, and the user can carry out additions and updates of paper information from the client PC 11. Alternatively, additions and updates of paper data may be carried out from the operation unit 305.

It should be noted that a case where new paper data is to be created on the print controller 12 side is the same as the case for the image forming apparatus 13 and predetermined paper data of the original paper information 401 or paper data selected from the original paper information 401 may be used as a base. That is, at step S801, the control unit 307 obtains original paper data of a predetermined ID from the image forming apparatus 13. Then, at step S802, paper data is created due to a new user definition by the user with the original paper data as the base. When new paper data is created, the control unit 307 sends at step S803 the new paper data and the ID of the original paper data used as a base to the image forming apparatus 13.

Upon receiving the new user-defined paper data and the ID of the original paper data from the print controller 12 at step S811, the job control unit 206 of the image forming apparatus 13 confers an ID to the new user-defined paper data at step S812. Here, the first two bytes of the ID of the original paper data received at step S811 are set as the first two bytes (original ID portion) of the conferred ID. Furthermore, a value is set in the lower two bytes (local ID portion) of the conferred ID so that it becomes a unique ID in that image forming apparatus 13. Then at step S813, the new user-defined paper information is registered in the user-defined paper information 501 in the image forming apparatus 13 with the ID that was set at step S812. Then, at step S814, the job control unit 206 notifies the print controller 12 of the ID that was set at step S812.

The control unit 307 of the print controller 12 receives the ID from the image forming apparatus 13 in step S804 and sets it as the ID in the image forming apparatus of the new paper data generated at step S802. Then, the new user-defined data is added and registered to the user-defined paper information 601 of the print controller 12 at step S805.

[Process when Changes are Carried Out to Paper Information at the Print Controller 12]

Figure 9:
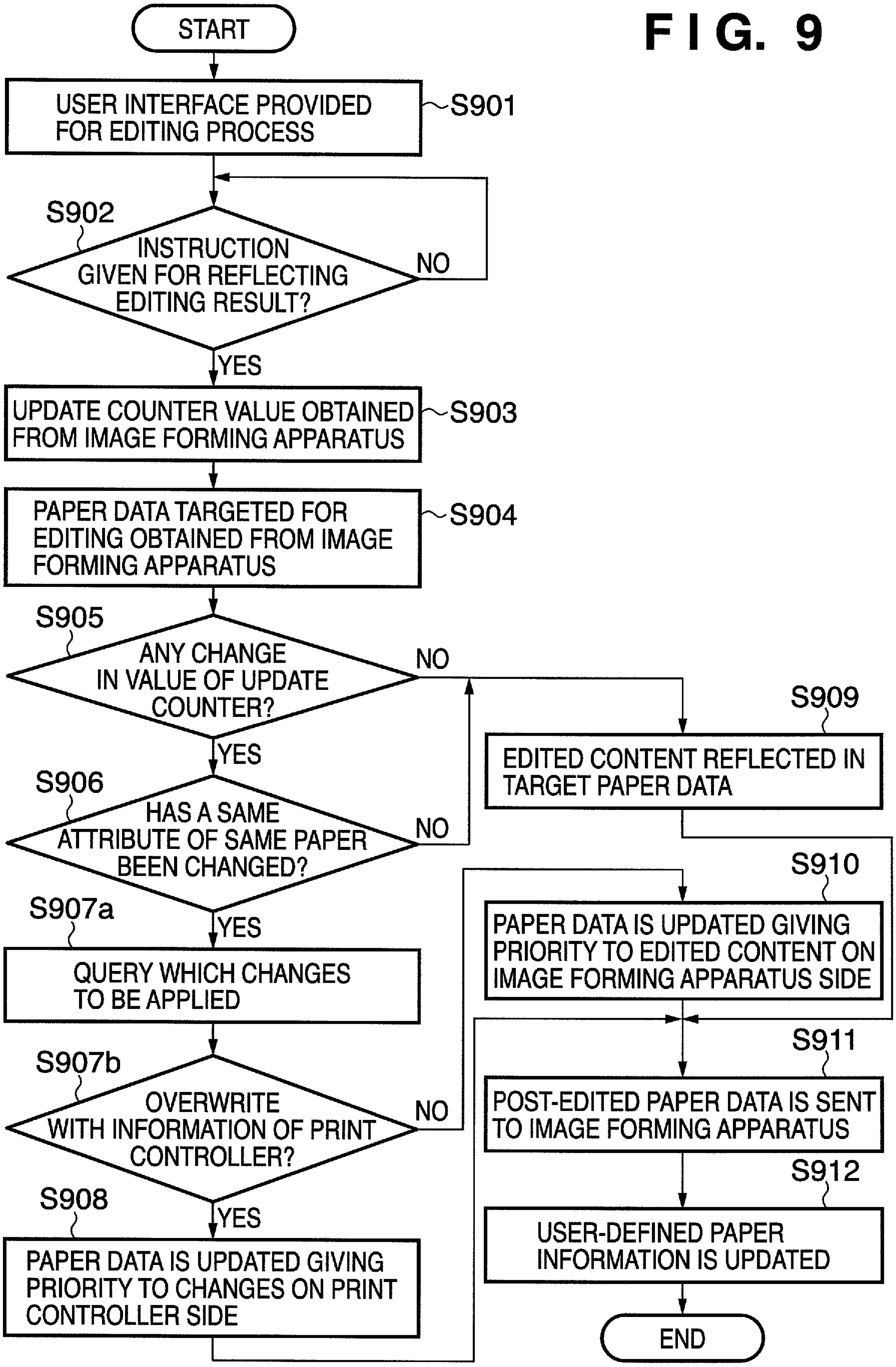
FIG. 9 is a flowchart for describing a process when paper information in the print controller is changed.

Next, FIG. 9 is used to describe a flow in which changes are made to existing paper information in the print controller 12.

First, the control unit 307 provides a user interface for carrying out editing at step S901. Then, at step S902, a determination is made as to whether or not there is an instruction for the editing result to be reflected. If there is an instruction for the editing result to be reflected, the control unit 307 obtains at step S903 the value of the update counter from the image forming apparatus 13 and obtains at step S904 paper data targeted for editing among the user-defined paper information 501 from the image forming apparatus 13.

At step S905, the control unit 307 determines whether or not the counter value of the update counter has been changed. Detection of change to the counter value is carried out by comparing the latest value of the update counter held at step S714 and the value of the update counter obtained at step S903. Then, if there has been no change to the value of the update counter, processing proceeds to step S909. At step S909, the control unit 307 reflects edited content, which has been set at step S901, onto the paper data obtained at step S904. Then, at step S911, the control unit 307 sends the edited paper data to the image forming apparatus 13. It should be noted that the image forming apparatus 13 that has received this edited paper data then updates the corresponding paper data in the user-defined paper information 501 based on the received paper data.

On the other hand, when the value of the update counter has been changed at step S905, this means that some change (editing/new addition) has been applied to the user-defined paper information 501 in the image forming apparatus 13 also. Accordingly, processing proceeds to step S906 and the control unit 307 carries out a determination based on the paper data targeted for editing and obtained at step S904 as to whether or not those changes were carried out regarding attributes of the paper targeted for editing that were targeted for editing at step S901. If the editing was not carried out in regard to same attributes of the same paper at step S901, then processing proceeds to step S909. At step S909, the control unit 307 updates the target paper data according to the content of the editing process of step S901. Then, at step S911, the control unit 307 sends the edited paper data to the image forming apparatus 13. It should be noted that when a different attribute of the same paper has been edited in the image forming apparatus 13, the changes of both the image forming apparatus 13 and the print controller 12 are reflected in this user-defined paper information. Furthermore, when different paper data has been updated, the updated content is reflected in the user-defined paper information 601 on the print controller 12 side in accordance with the process described above with FIG. 7B.

When a result of the determination at step S906 is that it is determined a change has been made regarding a same attribute of a same paper in the print controller 12 and the image forming apparatus 13, then the processing proceeds to step S907*a*. At step S907*a*, the print controller 12 provides an interface enabling the user to select which editing to be given priority using the operation unit 305 or the client PC 11. If the user gives instruction for the editing result of the print controller 12 side to be given priority, then the processing proceeds from step S907*b* to step S908 and the paper data is updated giving priority to the editing result on the print controller 12 side. That is, the editing result performed on the print controller 12 side is reflected to locations where corrections have been made to a same attribute of the same paper. Then, at step S911, the control unit 307 sends the post-updated paper information to the image forming apparatus 13.

On the other hand, if instruction is given at step S907*b* for the editing result at the image forming apparatus 13 to be given priority, then the processing proceeds to step S910 and the paper information is updated giving priority to the edited content of the image forming apparatus 13. That is, the editing result performed on the image forming apparatus 13 side is reflected to locations where corrections have been made to a same attribute of the same paper. Then, at step S911, the control unit 307 sends the post-updated paper data to the image forming apparatus 13.

After this, at step S912, the updated result is reflected in the user-defined paper information 601 on the print controller 12 side and processing finishes. It should be noted that when the value of the update counter has been changed it is possible that other user-defined data has been updated, and therefore steps S714 to S716 of FIG. 7B are executed and the value of the update counter is saved and an update of the user-defined data is carried out.

With the processes shown in FIGS. 7A, 7B, 8, and 9, reflection is achieved for updates (additions, changes) to the paper information in the image forming apparatus 13 or the print controller 12 and updates in the image forming apparatus 13 and the print controller 12.

[Flow at Time of Job Input]

Figure 10:
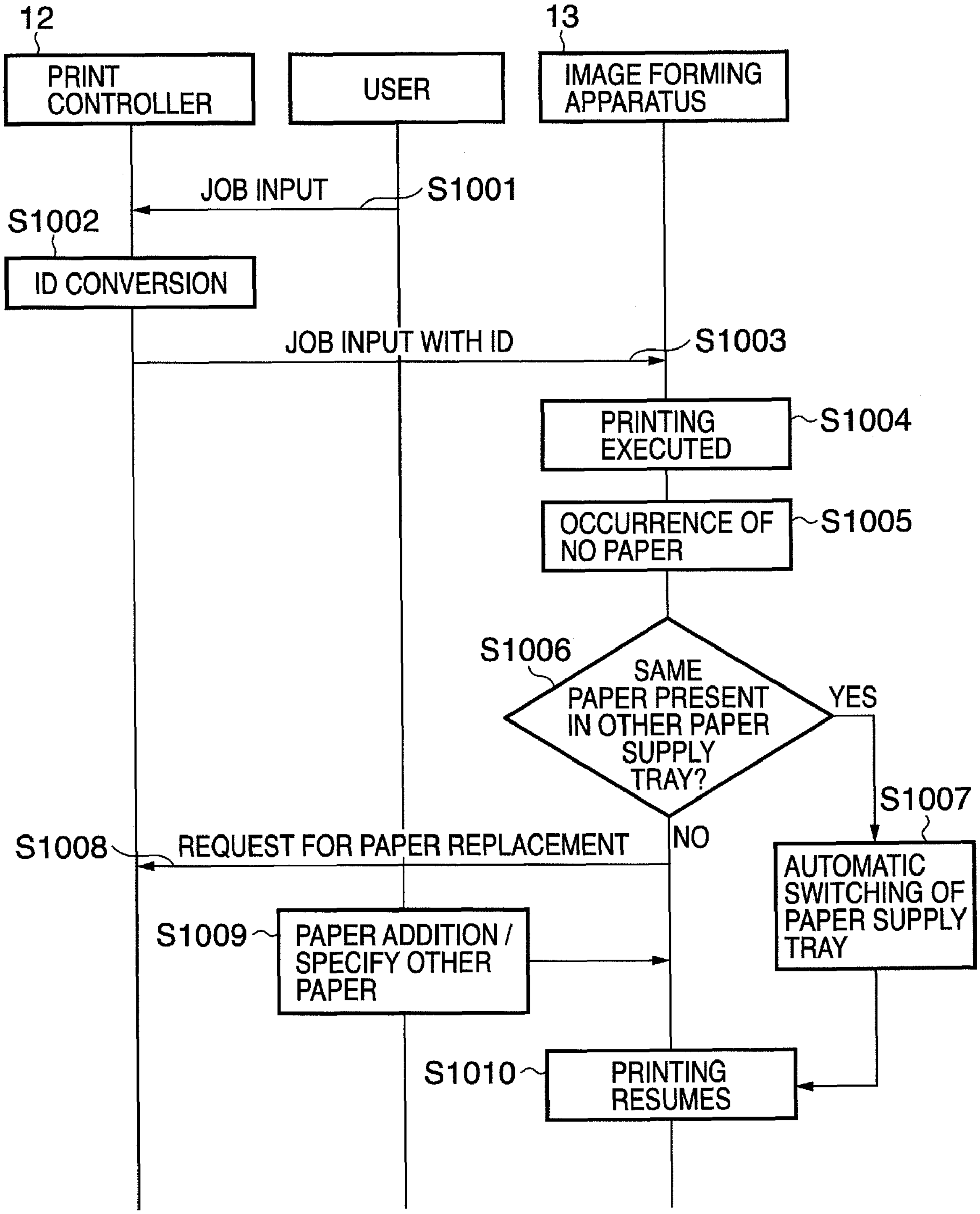
FIG. 10 is a diagram for describing a process when a job is inputted.

Next, FIG. 10 is used to describe an example in which a job is input using paper information of the print controller 12. Here an example is shown of when an actual job is inputted while paper information is managed in the print controller 12 and the image forming apparatus 13 using the above-described techniques. First, the user gives an instruction from the client PC 11 to the print controller 12 for paper and job input is carried out (step S1001). Here, the client PC 11 selects the paper desired to be used in image forming processing by the image forming apparatus 13 by specifying one of the plurality of IDs contained in the user-defined paper information 601. Specifically, a printer driver running on the client PC 11 prompts the user to select a paper and the ID corresponding to the selected paper is appended to the job and sent to the print controller 12.

The print controller 12 determines the ID appended to the job sent from the client PC 11 and references the user-defined paper information 601 in the print controller 12 for the paper specified by the ID and converts the ID to the ID in the image forming apparatus 13 (step S1002). For example, when the client PC 11 specifies the color plain paper of FIG. 6, the client PC 11 appends "1" to the job as an ID and sends this to the print controller 12. Then, the print controller 12 references the user-defined paper information 601 and converts ID=1 into ID=0700-0001 as the ID within the image forming apparatus 13. Then, the print controller 12 appends ID=0700-0001 to the job and puts (step S1003) the job including image data to be used in image forming into the image forming apparatus 13.

The image forming apparatus 13 references the ID in the image forming apparatus appended to the job sent from the print controller 12 and the user-defined paper information 501 then selects the paper indicated by the ID and commences (step S1004) print output (image forming) of the job. Here, the ID in the image forming apparatus appended to the job is 0700-0001, so "C company color plain paper" is selected as the paper to be used in carrying out image formation.

It should be noted that if an occurrence of no paper happens midway (step S1005), then the image forming apparatus 13 confirms (step S1006) whether or not the specified paper is present in another paper supply tray. If the specified paper is in another paper supply tray, then the paper supply tray is switched and printing continues (step S1007 and S1010). If the specified paper is not in another paper supply tray, then a paper replacement request is notified to the print controller 12 (step S1008). Furthermore, a display is made on the display device of the image forming apparatus 13 to the effect that paper replacement or refilling is required. When the user notices and refills the paper or specifies another paper (paper replacement), the image forming apparatus 13 automatically resumes printing (step S1009 and S1010).

[Flow of Backup Processing]

Description is given next concerning an operation of backing up paper information. In the present embodiment, user-defined paper information (processes in FIGS. 7A, 7B, 8, and 9), the content of which is synchronized in the print controller 12 and the image forming apparatus 13 respectively, is backed up in both the print controller 12 and the image forming apparatus 13. That is, the user-defined paper information 601 of the print controller 12 is backed up in both the print controller 12 and the image forming apparatus 13. Furthermore, the user-defined paper information 501 of the image forming apparatus 13 is also backed up in both the image forming apparatus 13 and the print controller 12.

Figure 11:
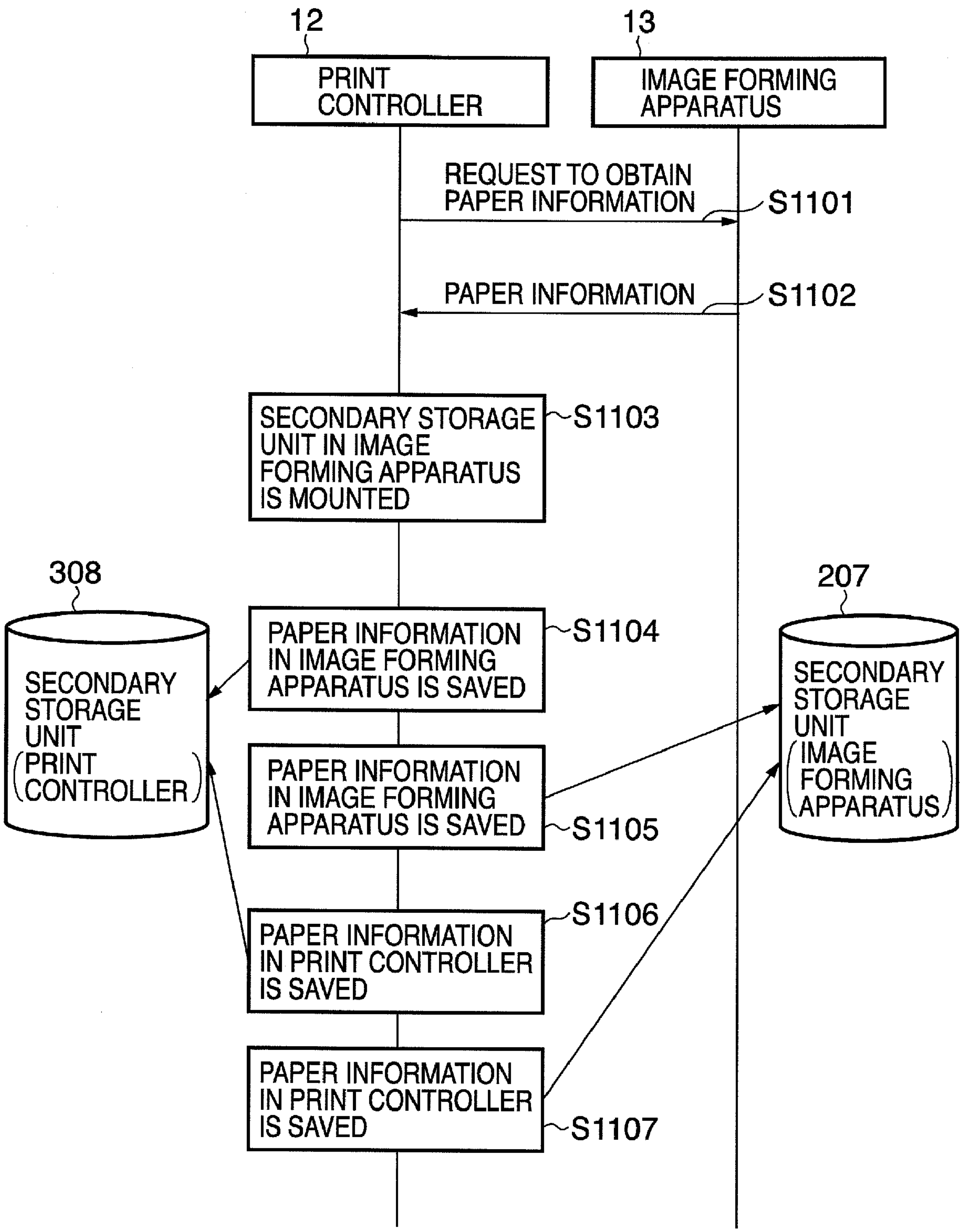
FIG. 11 is a diagram for describing a backup process according to the first embodiment.

FIG. 11 is a diagram for describing a flow of backup processing according to the present embodiment. First, the print controller 12 obtains (steps S1101 and S1102) user-defined data (user-defined paper information in the present example) from the image forming apparatus 13 by issuing a request to the image forming apparatus 13 to obtain paper information. Then, the control unit 307 mounts (step S1103) the secondary storage unit 207 of the image forming apparatus 13 in the print controller 12 using a commonly known method such as NFS (network file system), AFP (AppleTalk filing protocol), and SMB (server message block). Next, the control unit 307 saves (steps S1104 and S1105) the user-defined paper information 501 obtained at step S1101 and S1102 in the secondary storage unit 308 of the print controller 12 and the secondary storage unit 207 of the image forming apparatus 13. Following this, the control unit 307 saves (steps S1106 and S1107) the user-defined paper information 601, which is being managed in the print controller 12, in the secondary storage unit 308 of the print controller 12 itself and the secondary storage unit 207 of the image forming apparatus 13. Thus, backup processing is finished.

[Restore Process: when Print Controller is Replaced]

Next, description is given concerning a process of recovering (hereinafter "restoring") user-defined data to a newly connected print controller using user-defined data that has been backed up in the image forming apparatus 13 when a replacement of the print controller is carried out. It should be noted that in the present embodiment user-defined paper information is backed up between both the print controller and the image forming apparatus and therefore the restore process can be applied when either of the print controller or the image forming apparatus is replaced. Processing when the image forming apparatus is replaced is described later.

Furthermore, in the present embodiment, it is assumed that the apparatus having the operation unit on which a restore instruction was carried out is the apparatus that has been replaced. The restore process is carried out with that apparatus. For example, when a restore is executed due to a replacement of the print controller, instruction is given to commence the restore from the operation unit 305 of the new (replaced) print controller 12 after the image forming apparatus 13 and the new print controller 12 have been connected. Or the restore may be set to commence automatically in cases where the print controller 12 itself can distinguish that it has been replaced.

Figure 12:
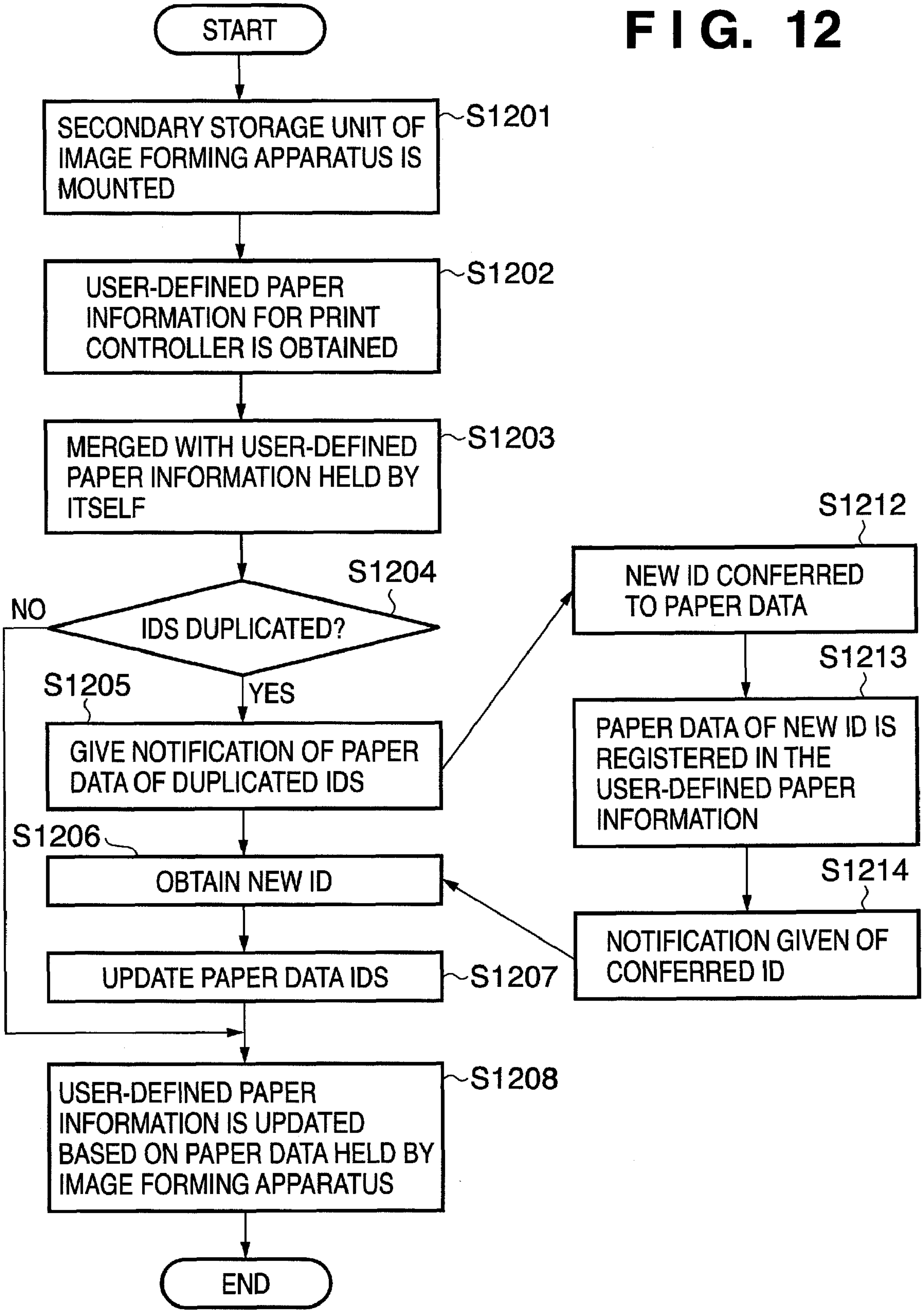
FIG. 12 is a flowchart showing a restore process when the print controller is replaced.

In response to an instruction to commence a restore, the control unit 307 commences the restore process shown in FIG. 12. First at step S1201 the control unit 307 mounts the secondary storage unit 207 of the image forming apparatus 13 to which it is connected. Then, at step S1202, the control unit 307 obtains the user-defined paper information for the print controller, which is backed up in the image forming apparatus 13. At step S1203, the control unit 307 merges the user-defined paper information obtained at step S1202 with the user-defined paper information for the print controller, which is backed up in its own secondary storage unit 308.

At step S1204, the control unit 307 determines whether or not there is an instance of more than one set of paper information having the same image forming apparatus ID (whether or not an ID in the image forming apparatus is duplicated) as a result of the merging of user-defined paper information at step S1203. If there is no instance of image forming apparatus IDs being duplicated, then the procedure proceeds to step S1208.

Image forming apparatus IDs are shared in the image forming system, which is constituted by the print controller and the image forming apparatus, and these IDs are not permitted to be duplicated. Consequently, when it is determined that a duplication of image forming apparatus IDs has occurred at step S1204, the processing proceeds to step S1205. At step S1205 the control unit 307 notifies the image forming apparatus 13 of one of the sets of paper data having duplicated IDs to cause the image forming apparatus 13 to perform a reassignment of image forming apparatus IDs. For example, of the sets of paper data having duplicated image forming apparatus IDs, the paper data being held in the print controller 12 is notified to the image forming apparatus 13 and a re-conferment of IDs is carried out.

Upon receiving notification from step S1205, the job control unit 206 of the image forming apparatus 13 confers (step S1212) a new ID to the paper data about which notification has been given. Then, the job control unit 206 registers (step S1213) the paper data with the new ID in the user-defined paper information 501 and notifies (step S1214) the print controller 12 of the ID that has been conferred at step S1212.

The control unit 307 of the print controller 12 receives notification of the ID from the image forming apparatus 13 at step S1206. Then, at step S1207, ID duplication is eliminated by updating the image forming apparatus ID of paper data corresponding to the user-defined paper information 601 that was merged at step S1203. After this, at step S1208, the remaining paper data being held by the print controller 12 only is registered to the image forming apparatus, thereby completing the restore.

In this manner, even when the print controller 12 is replaced, it is possible to continue to make use of the user-defined paper information from before the replacement. Furthermore, the print controller 12 can maintain user-defined paper information that was defined in an environment prior to replacement and is able to make use of settings that have been made up until then.

The foregoing restore process is described using a specific example shown in FIGS. 18A to 18C. FIG. 18A shows a situation in which a print controller 12' having user-defined paper information 1801 is connected to an image forming apparatus 13 having user-defined paper information 1803. In this case, a backup of the user-defined paper information 1801 of the print controller 12' is held in the image forming apparatus 13 as user-defined paper information 1802. Suppose that in this state, as shown in FIG. 18B, a replacement is made to the print controller 12, which holds the user-defined paper information 1804. When this happens, the user-defined paper information 1804 of the newly connected print controller 12 is merged with the user-defined paper information 1802 for the print controller, which is backed up in the image forming apparatus 13. Thus, user-defined paper information 1805 that has been merged is generated (step S1203).

The user-defined paper information 1805 has paper data 1805*a* and 1805*b* in which image forming apparatus IDs are duplicated (both are ID=0700-0001). Consequently, of these sets of paper data, a new ID is obtained (step S1205 and S1206) from the image forming apparatus 13 for the paper data 1805*b* that was being held by the print controller 12.

As shown in FIG. 18C, a new ID=0700-0002 is conferred by the image forming apparatus 13 to the paper data 1805*b*. Thus, duplication of IDs in the user-defined paper information 1805 is eliminated by using this and user-defined paper information 1806 can be obtained (step S1206, S1207). On the other hand, at the image forming apparatus 13, paper data corresponding to the paper data 1805*b* is added to the user-defined paper information 1803 (step S1213). It should be noted that when paper data having duplicated IDs is to be sent, the print controller 12 extracts the corresponding paper data from the user-defined paper information for the image forming apparatus, which the print controller 12 itself is backing up, and gives notification of this to the image forming apparatus. Further still, notification is given to the image forming apparatus of paper data for the image forming apparatus corresponding to the paper data 1805*c* that was being held by the print controller 12 only, and this is added and registered (step S1208) to the user-defined paper information of the image forming apparatus. Thus, user-defined paper information 1807 is generated.

[Restore Process: when Image Forming Apparatus is Replaced]

Figure 13:
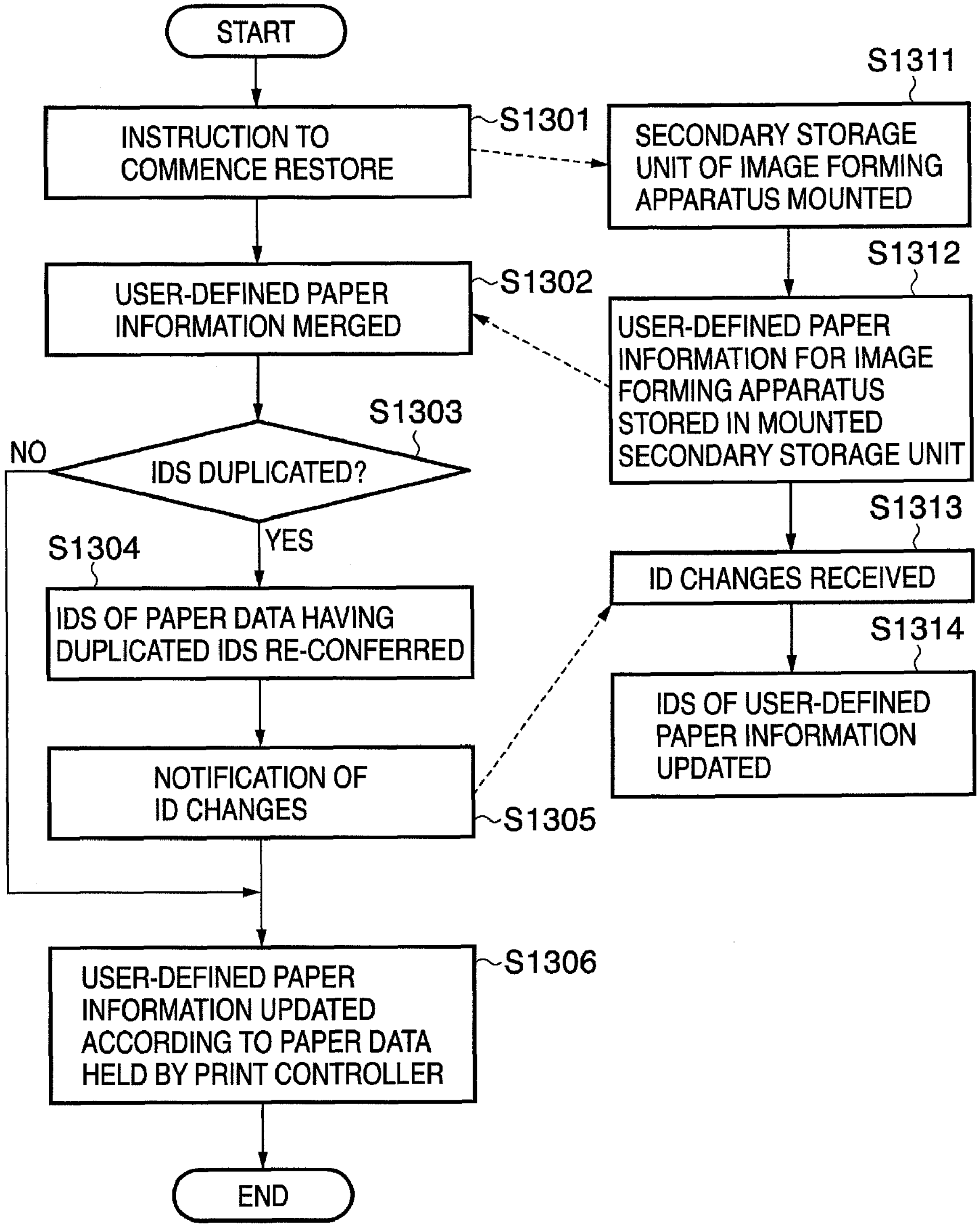
FIG. 13 is a flowchart showing a restore process when the image forming apparatus is replaced.

Next, referring to FIG. 13, description is given concerning a process of recovering (hereinafter "restoring") user-defined paper information using user-defined paper information that has been backed up when the print controller 12 remains as it is and a replacement by a different image forming apparatus 13 is carried out. As stated earlier, the instruction for the restore in this case is carried out from an operation unit 209 of an image forming apparatus 13.

When an instruction is given from the operation unit 209 to commence the restore, the job control unit 206 notifies the print controller 12 at step S1301 of the commencement of the restore. Upon receiving notification of commencement of the restore, the control unit 307 of the print controller 12 mounts the secondary storage unit 207 of the image forming apparatus 13 at step S1311. Then, at step S1312, the control unit 307 stores the user-defined paper information for the image forming apparatus that is being backed up by itself into the secondary storage unit 207 of the image forming apparatus 13. It should be noted that in the present example a mounting function of the print controller 12 is used for the image forming apparatus 13 to obtain the user-defined paper information that is being backed up by the print controller 12, but there is no limitation to this. This may also be configured such that the image forming apparatus 13 actively obtains the user-defined paper information that is being backed up from the print controller 12.

With the process of step S1312, user-defined paper information backed up by the image forming apparatus itself and user-defined paper information backed up by the print controller 12 are stored in the secondary storage unit 207 of the image forming apparatus 13. At step S1302, the job control unit 206 of the image forming apparatus 13 merges these two sets of backed up user-defined paper information that are being stored in the secondary storage unit 207. Then, at step S1303, a determination is made as to whether or not duplication has occurred in the IDs inside the image forming apparatus in the user-defined paper information that has been merged. If no duplication has occurred, then processing proceeds to step S1306.

If ID duplication has occurred, then the processing proceeds to step S1304. At step S1304, the job control unit 206 reassigns IDs of paper data in which IDs are duplicated. Here, the job control unit 206 reassigns the IDs of paper data that have been held in the print controller 12. Then, at step S1305, the job control unit 206 notifies the print controller 12 of the changed ID. Then, at step S1306, paper data registered in the user-defined paper information for the image forming apparatus being held backed up by the print controller is added to the print controller's own user-defined paper information and the restore process finishes.

On the other hand, upon receiving notification of ID changes from the image forming apparatus, the print controller 12 changes (step S1313 and S1314) the IDs of the corresponding paper data in the user-defined paper information for the print controller itself.

The foregoing restore process is described using a specific example shown in FIGS. 19A to 19C. FIG. 19A shows a situation in which a print controller 12 having user-defined paper information 1901 is connected to an image forming apparatus 13' having user-defined paper information 1903. And a backup of the user-defined paper information 1903 of the image forming apparatus 13' is held in the print controller 12 as user-defined paper information 1902. In this state, as shown in FIG. 19B, a replacement is made to the image forming apparatus 13, which holds the user-defined paper information 1904. When this happens, the user-defined paper information 1904 of the newly connected image forming apparatus 13 is merged with the user-defined paper information 1902, which is backed up in the print controller. Thus, user-defined paper information 1905 that has been merged is generated (step S1302).

The user-defined paper information 1905 has paper data 1905*a* and 1905*b* in which image forming apparatus IDs are duplicated (ID=0700-0001). Consequently, of these sets of paper data, a new ID is conferred (step S1304) by the image forming apparatus 13 for the paper data 1905*b* that was being held by the print controller 12.

A result, as shown in FIG. 19C, is that a new ID=0700-0002 is conferred by the image forming apparatus 13 to the paper data 1905*b*. Thus, duplication of IDs in the user-defined paper information 1905 is eliminated by using this and user-defined paper information 1906 can be obtained. The print controller 12 is notified of the change in ID and updates the ID inside the image forming apparatus 13 as indicated in the user-defined paper information 1907. Furthermore, the user-defined paper information for the print controller that was being backed up by the image forming apparatus 13 is sent to the print controller 12 and the print controller 12 adds this to its own user-defined paper information. Thus, user-defined paper information 1907 is generated and the restore is completed.

As described above, with the first embodiment, user-defined data (user-defined paper information) can be appropriately maintained even when a print controller replacement or an image forming apparatus replacement occurs. Thus, a user who inputs a job from the client PC 11 is able to continue operation after replacement of an apparatus without any difference from prior to the replacement.

Second Embodiment

In the backup process of the first embodiment, the print controller 12 mounted the secondary storage unit 207 of the image forming apparatus 13, and user-defined data (user-defined paper information) of both the print controller 12 and the image forming apparatus 13 was stored in the secondary storage unit 207. However, the backup process is not limited to this and the print controller 12 and the image forming apparatus 13 may respectively obtain user-defined data of the other and store this in the secondary storage unit. In the second embodiment, description is given concerning backup processing in this manner. It should be noted that in the second embodiment also description is given using user-defined paper information as an example of user-defined data.

Figure 14:
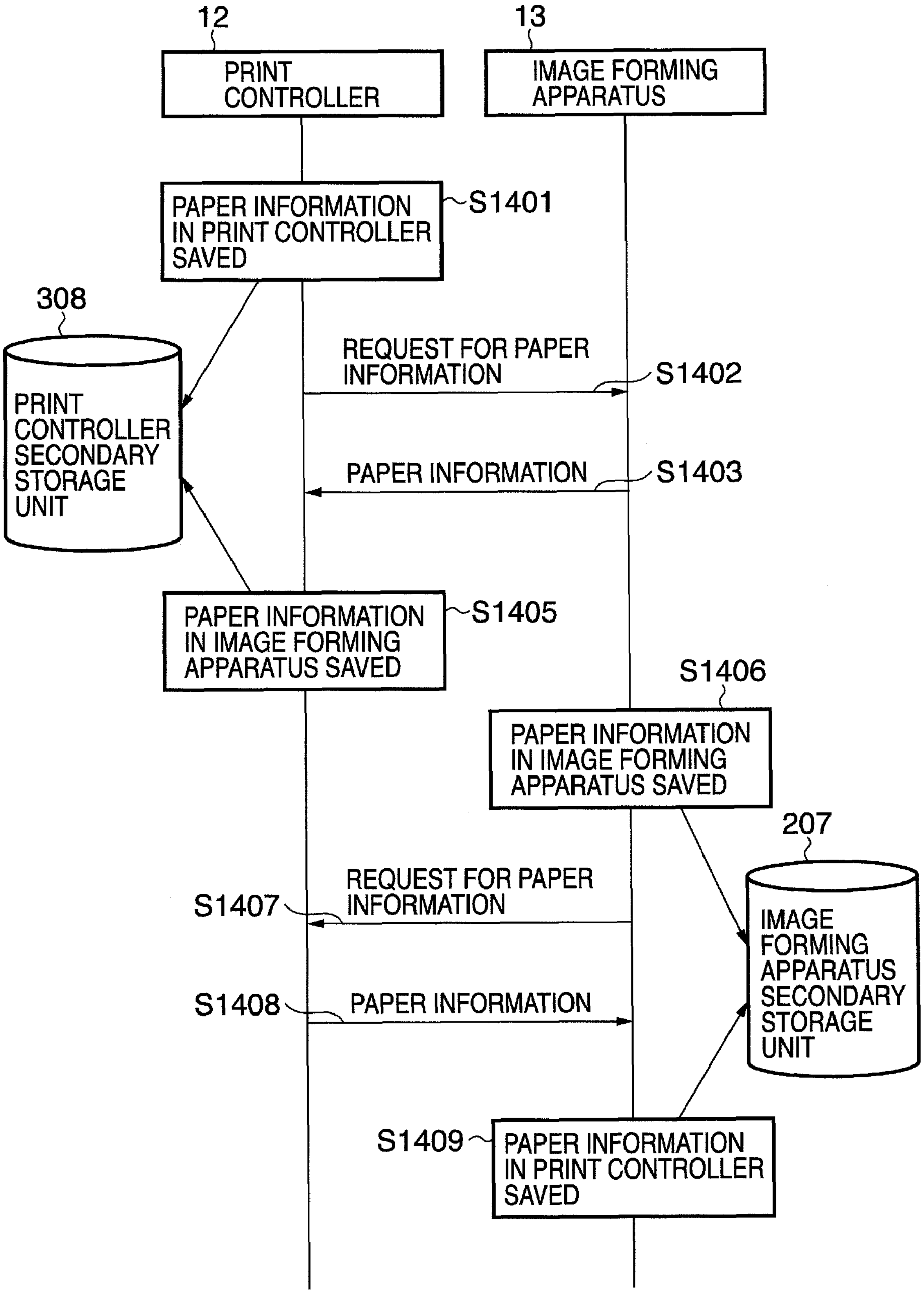
FIG. 14 is a diagram for describing a backup process according to a second embodiment.

FIG. 14 is a diagram for describing a flow of backup processing according to the second embodiment. When a timing arrives for executing the backup process, the print controller 12 saves (step S1401) its user-defined paper information in its internal secondary storage unit 308. Then, the print controller 12 requests (step S1402) for the image forming apparatus 13 to send the user-defined paper information of the image forming apparatus 13. In response to this request, the image forming apparatus 13 sends its own user-defined paper information to the print controller 12 (step S1403). Upon receiving the user-defined paper information from the image forming apparatus 13, the print controller 12 stores (S1405) the user-defined paper information for the image forming apparatus 13 in the secondary storage unit 308.

On the other hand, due to the request from the print controller 12 for the sending of the user-defined paper information, the image forming apparatus 13 recognizes that the backup process has commenced. Then, the image forming apparatus 13 stores (step S1406) in the secondary storage unit 207 the user-defined paper information for the image forming apparatus that it itself is holding. Then, this time the image forming apparatus 13 requests (step S1407) the print controller 12 to send the user-defined paper information inside the print controller 12. In response to this send request, the print controller 12 sends (step S1408) the user-defined paper information that it is holding itself to the image forming apparatus 13. Upon receiving the user-defined paper information from the print controller 12, the image forming apparatus 13 stores (step S1409) that user-defined paper information for the print controller 12 in the secondary storage unit 207.

In this manner, the backup process by which both of these back up each other's user-defined paper information is completed.

The restore process using the user-defined paper information that has been backed up in this manner can be carried out in the same manner as the first embodiment. In this case, the process of step S1201 and step S1202 (the process by which the print controller 12 obtains the user-defined paper information that is backed up in the image forming apparatus 13) can be achieved in a same manner as the above-described procedure of step S1402 and step S1403. Furthermore, the process of step S1311 and S1312 (the process by which the image forming apparatus 13 obtains the user-defined paper information that is backed up in the print controller 12) can be achieved by the procedure of the above-described step S1407 and S1408.

Third Embodiment

In the backup process of the second embodiment, it is possible to execute only the steps S1401 to S1405 of FIG. 14. For example, in an environment where it is sufficient to suppose a replacement of the image forming apparatus 13 only, backing up may be carried out only at the print controller 12. It should be noted that in the third embodiment the above-described restore process can be executed when a problem occurs in the image forming apparatus 13 and it is to be replaced, but this process does not support the case of a print controller 12 replacement occurring.

Fourth Embodiment

In the foregoing third embodiment, description was given concerning backing up paper information in the backup process for user-defined data, but the user-defined data targeted for backup is not limited to paper information. In a fourth embodiment, description is given of an example relating not only to paper information, but to information in the image forming apparatus 13 and the print controller 12 to be backed up and the backup timing.

FIG. 15 shows an example of a relationship between information to be backed up and storage locations and capacities thereof. The paper information is stored as described above in the secondary storage units 207 and 308 and the capacities thereof may be supposed to be approximately 1 Mbyte. The print settings information is stored in the secondary storage unit 207 or the non-volatile RAM 210 and this too may be supposed to be approximately 1 Mbyte. The address book is also stored in the secondary storage unit 207 and is approximately several Mbyte. Stored document information depends on the number of documents being stored, but is conceivably up to several hundred Mbyte. Furthermore, the system software for running the image forming apparatus 13 and the print controller 12 is also conceivably up to several tens of Mbyte. It takes time to back up such large volumes of data in the print controller 12 and the image forming apparatus 13. That is to say, frequent backing up of large sized stored documents and the like gives rise to a problem of not being able to perform the intended job processing for the user.

Figure 16:
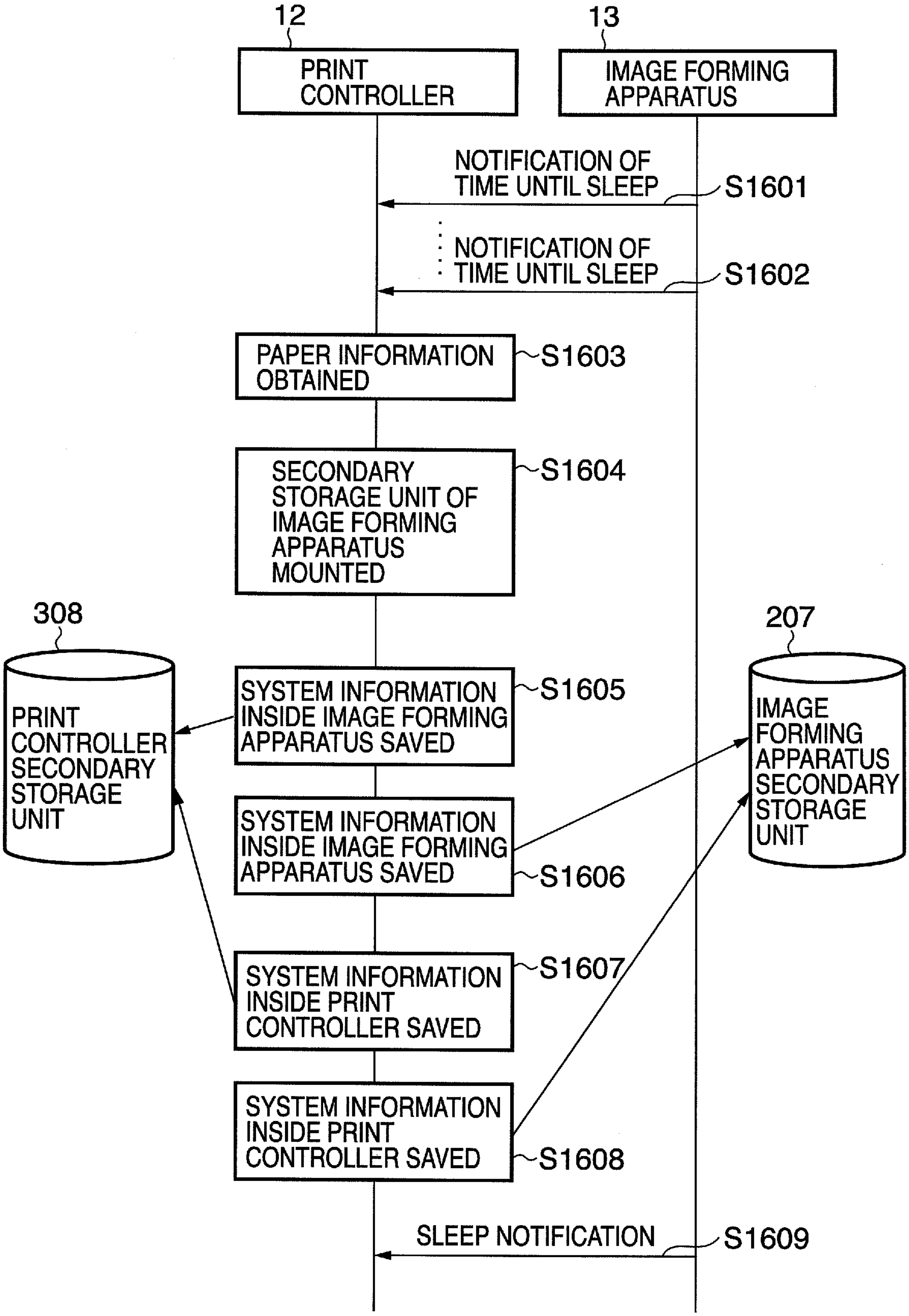
FIG. 16 is a diagram for describing a backup process according to the fourth embodiment.

In a fourth embodiment, description is given of a configuration in which information backup processing can be executed with appropriate timing. FIG. 16 is a flowchart for describing a commencement timing for backup processing according to the fourth embodiment.

First, notification is given periodically (step S1601) from the image forming apparatus 13 of the time until sleep. Then, upon receiving (step S1602) notification indicating that there is a predetermined time (60 seconds in the present example) until the time for sleep, backup processing commences as indicated in step S1603 to S1608. The backup processing is the same as that in step S1101 to S1107 shown in FIG. 11. However, the information to be saved is the entire system information as shown in FIG. 15. That is, system information in the image forming apparatus 13 is saved in the secondary storage unit 308 of the print controller 12, and the same information is saved in the secondary storage unit 207 of the image forming apparatus 13. Furthermore, system information in the print controller 12 is saved in the secondary storage unit 308 of the print controller 12, and the same information is saved in the secondary storage unit 207 of the image forming apparatus 13.

When backup processing is finished, the image forming apparatus 13 notifies the print controller 12 concerning sleep and transitions itself into a sleep state (step S1609). Upon receiving the sleep notification, the print controller 12 also commences processing for sleep. In this way, large volumes of information can be backed up at a time of transitioning to a sleep state.

It should be noted that in the foregoing embodiment description was given concerning a process at a time of sleep of backing up information that takes time to back up, but the timing for this backup process is not limited to the time of sleep and may be executed for example at a time of stopping a power supply to the image forming apparatus or the print controller, or a time of powering up.

Fifth Embodiment

Figure 17:
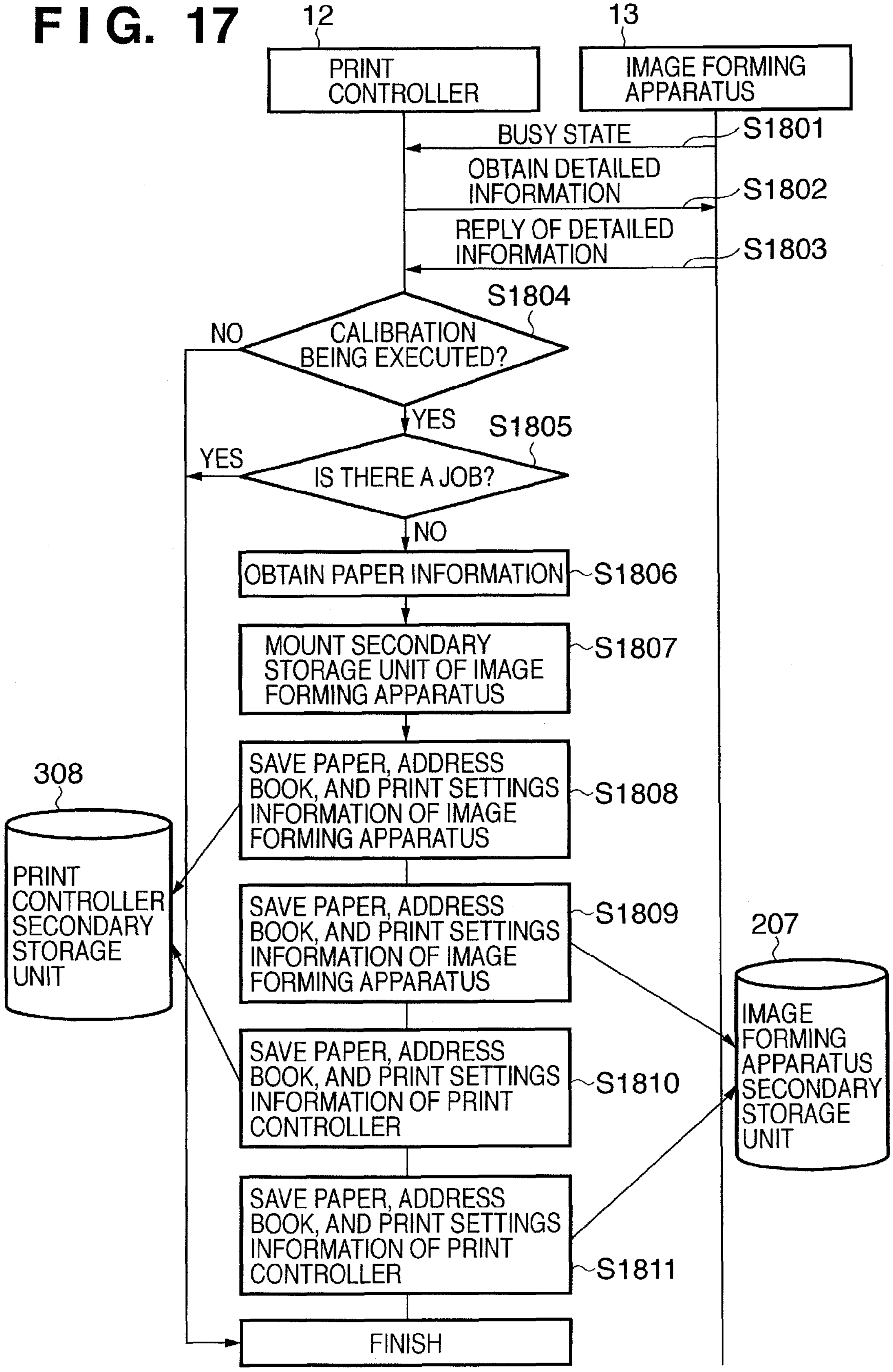
FIG. 17 is a diagram for describing a backup process according to a fifth embodiment.

In a fifth embodiment, description is given using FIG. 17 in regard to an example of carrying out a backup process during calibration of the image forming apparatus 13 of information whose backup can be completed comparatively quickly. In the fifth embodiment, paper information, address information (address book), and print settings information are backed up during an adjusting operation such as calibration processing.

First, notification of a busy state is given (step S1801) from the image forming apparatus 13 to the print controller 12. The print controller 12 obtains (step S1802 and S1803) detailed information from the image forming apparatus 13 in regard to the busy state. Then, from the detailed information received at step S1803, the print controller 12 determines (step S1804) whether or not the image forming apparatus 13 is undergoing a calibration process such as color correction for example. When the image forming apparatus 13 is undergoing execution of calibration, a determination is made (step S1805) as to whether or not there is a job to be processed in the print controller 12. If there is no job to be processed and the print controller 12 is in an idle state, backup processing is executed according to step S1806 to S1811. It should be noted that the backup processing of step S1806 to S1811 is the same as that in step S1101 to S1107 shown in FIG. 11. However, in the present example, the content to be backed up includes, in addition to paper information, address information (address book) and print settings information, which are comparatively small in volume among the system information of FIG. 5.

That is, paper information is obtained (S1806) from the image forming apparatus 13 and the secondary storage unit 207 of the image forming apparatus 13 is mounted (step S1807), then the address book and print settings information and the like are obtained from the image forming apparatus 13. Then, paper information, address book, and print settings information is saved (step S1808) in the secondary storage unit 308 of the print controller 12, and is similarly saved (step S1809) in the secondary storage unit 207 of the image forming apparatus 13. Furthermore, information such as paper information, address book, and print settings in the print controller 12 is saved in the secondary storage unit 308 of the print controller 12 (step S810), and similarly saved also in the secondary storage unit 207 of the image forming apparatus 13 (step S1811).

It should be noted that the fifth embodiment involved processing during calibration, but since the backup is of information that is comparatively small in volume, it may also be conducted at the time of powering up or the time of power shut down, or be set to be conducted periodically at fixed time intervals. Then, backing up for all of the information shown in FIG. 15, including large volume information, may be executed at times of transitioning to sleep as shown in the fourth embodiment.

Sixth Embodiment

It should be noted that in the foregoing embodiment the backup targets were paper information, address books, saved images, and the like, but this is applicable to other information to be saved such as PDL data and intermediate data being saved as long as it is comparatively small in volume.

As described above, with the foregoing embodiments, a restore can be achieved when a different controller is connected to a same printing apparatus or when a new controller is reconnected. In particular, since merging of the paper information can be achieved appropriately, the user can use the system after replacement of an apparatus without any sense of disjointedness.

Furthermore, the backup destination is set to both the secondary storage unit of the printing apparatus and the secondary storage unit of the controller, and therefore recovery is possible even when either of these totally breaks down. Moreover, the effect that backup processing has on the user can be reduced since the backup of information is executed at such times as when transitioning to sleep, when powering up, or during the execution of calibration.

With the present invention, an image forming system, in which an image processing apparatus and an image forming apparatus are connected, is able to appropriately maintain paper information that was used in the image processing apparatus or the image forming apparatus prior to a replacement when a replacement of the image processing apparatus or a replacement of the image forming apparatus occurs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-100398, filed Mar. 31, 2006, which is hereby incorporated by reference herein in its entirety.

What is claimed is:

1. An image forming system, in which an image forming apparatus and an image processing apparatus that sends image data to the image forming apparatus are communicably connected, comprising:

a first holding unit configured to hold in the image processing apparatus both a first paper information to be used in the image processing apparatus and a second paper information to be used in the image forming apparatus;

a second holding unit configured to hold in the image forming apparatus both the first paper information and the second paper information, wherein the first paper information and the second paper information include data for each paper respectively, and a common identifier is conferred to paper data that corresponds between the first and second paper information;

a merging unit configured to, when the image processing apparatus has been replaced by a new image processing apparatus, merge the first paper information held in the second holding unit and the first paper information held in the new image processing apparatus and, when the image forming apparatus has been replaced by a new image forming apparatus, merge the second paper information held in the first holding unit and the second paper information held in the new image forming apparatus;

a change unit configured to change an identifier in regard to paper data in which identifiers are duplicated as a result of merging by the merging unit so as to eliminate duplication of identifiers;

an update unit configured to update the first paper information to be used by the new image processing apparatus and the second paper information to be used by the new image forming apparatus based on a merging result obtained by the merging unit and the change unit, and a selecting unit configured to select, based on the identifier that is sent with image data by the image processing apparatus and the updated second paper information, paper to be used in carrying out image forming according to image data using the image forming apparatus.

2. The system according to claim 1, wherein the first holding unit obtains and holds the second paper information from the image forming apparatus with a predetermined timing and the second holding unit obtains and holds the first paper information from the image processing apparatus with the predetermined timing.

3. The system according to claim 2, wherein the predetermined timing is a timing of at least one of a timing by which the image forming apparatus transitions to a sleep state, a timing by which the image forming apparatus executes an adjusting operation, a timing by which a power supply is stopped to the image processing apparatus or the image forming apparatus, and a timing by which a predetermined time interval has elapsed.

4. The system according to claim 1, further comprising a first update unit configured to update the second paper information of the image forming apparatus in response to an update of the first paper information by the image processing apparatus.

5. The system according to claim 1, further comprising a second update unit configured to update the first paper information of the image processing apparatus in response to an update of the second paper information by the image forming apparatus.

6. An image processing apparatus connectable to an image forming apparatus in which both a first paper information to be used in the image processing apparatus and a second paper information to be used in the image forming apparatus are held, wherein the first paper information and the second paper information include data for each paper respectively, and a common identifier is conferred to paper data that corresponds between the first and second paper information, comprising:

an obtaining unit configured to obtain the first paper information from the image forming apparatus;

a merging unit configured to merge the first paper information obtained by the obtaining unit and the first paper information being held by itself;

a change unit configured to change an identifier when duplication of identifiers has occurred in the first paper information obtained by the merging unit so as to eliminate duplication of identifiers;

an update unit configured to update the first paper information based on a merging result obtained by the merging unit and the change unit, and a sending unit configured to send image data to the image forming apparatus along with the identifier conferred to the updated first paper information by the update unit, the image data being used in image forming by the image forming apparatus.

7. The apparatus according to claim 6, further comprising a notification unit configured to notify the image forming apparatus of paper data in which identifiers are duplicated as a result of merging by the merging unit, wherein the change unit eliminates duplication of the identifiers based on new identifiers sent by the image forming apparatus in response to notification by the notification unit.

8. An image forming apparatus connectable to an image processing apparatus in which both a first paper information to be used in the image processing apparatus and a second paper information to be used in the image forming apparatus are held, wherein the first paper information and the second paper information include data for each paper respectively, and a common identifier is conferred to paper data that corresponds between the first and second paper information, comprising:

an obtaining unit configured to obtain the second paper information from the image processing apparatus;

a merging unit configured to merge the second paper information obtained by the obtaining unit and the second paper information being held by itself;

a change unit configured to change an identifier when duplication of identifiers has occurred in the second paper information obtained by the merging unit so as to eliminate duplication of identifiers;

an update unit configured to update the second paper information based on a merging result obtained by the merging unit and the change unit, and a selecting unit configured to select, based on the identifier that is sent with image data by the image processing apparatus and the updated second paper information, paper to be used in carrying out image forming according to image data using the image forming apparatus.

9. The apparatus according to claim 8, further comprising a notification unit configured to notify the image processing apparatus of an update of an identifier when a change in the second paper information obtained by the image processing apparatus has occurred as a result of a change to the identifier by the change unit.

10. A control method for an image forming system, in which an image forming apparatus and an image processing apparatus that sends image data to the image forming apparatus are communicably connected, the method comprising:

a first holding step of holding in a first holding means of the image processing apparatus both a first paper information to be used in the image processing apparatus and a second paper information to be used in the image forming apparatus;

a second holding step of holding in a second holding means of the image forming apparatus both a first paper information to be used in the image processing apparatus and a second paper information to be used in the image forming apparatus, wherein the first paper information and the second paper information include data for each paper respectively, and a common identifier is conferred to paper data that corresponds between the first and second paper information;

a merging step of, when the image processing apparatus has been replaced by a new image processing apparatus, merging the first paper information being held in the second holding means and the first paper information held in the new image processing apparatus and, when the image forming apparatus has been replaced by a new image forming apparatus, merging the second paper information being held in the first holding means and the second paper information held in the new image forming apparatus;

a change step of changing an identifier in regard to paper data in which identifiers are duplicated as a result of merging in the merging step so as to eliminate duplication of identifiers;

an update step of updating the first paper information to be used by the new image processing apparatus and the second paper information to be used by the new image forming apparatus based on a merging result obtained by the merging step and the change step; and a selecting step of selecting, based on the identifier that is sent with image data by the image processing apparatus and the updated second paper information, paper to be used in carrying out image forming according to image data using the image forming apparatus.

11. A control method for an image processing apparatus connectable to an image forming apparatus in which both a first paper information to be used in the image processing apparatus and a second paper information to be used in the image forming apparatus are held, wherein the first paper information and the second paper information include data for each paper respectively, and a common identifier is conferred to paper data that corresponds between the first and second paper information, the method comprising:

an obtaining step of obtaining the first paper information from the image forming apparatus;

a merging step of merging the first paper information obtained by the obtaining step and the first paper information being held by itself;

a change step of changing an identifier when duplication of identifiers has occurred in the first paper information obtained by the merging step so as to eliminate duplication of identifiers;

an update step of updating the first paper information based on a merging result obtained by the merging step and the change step; and a sending step of sending image data to the image forming apparatus along with the identifier conferred to the updated first paper information by the update step, the image data being used in image forming by the image forming apparatus.

12. A control method for an image forming apparatus connectable to an image processing apparatus in which both a first paper information to be used in the image processing apparatus and a second paper information to be used in the image forming apparatus are held, wherein the first paper information and the second paper information include data for each paper respectively, and a common identifier is conferred to paper data that corresponds between the first and second paper information, the method comprising:

an obtaining step of obtaining the second paper information from the image processing apparatus;

a merging step of merging the second paper information obtained by the obtaining step and the second paper information being held by itself;

a change step of changing an identifier when duplication of identifiers has occurred in the second paper information obtained by the merging step so as to eliminate duplication of identifiers;

an update step of updating the second paper information based on a merging result obtained by the merging step and the change step; and a selecting step of selecting, based on the identifier that is sent with image data by the image processing apparatus and the updated second paper information, paper to be used in carrying out image forming according to image data using the image forming apparatus.

13. An image forming system having an image processing apparatus and an image forming apparatus that performs image forming processing based on image data sent from the image processing apparatus, wherein the image processing apparatus comprises:

a first holding unit configured to store a first paper information including at least identification information identifying paper to be used in the image forming processing and processing condition information indicating a processing condition of when image forming processing is executed using the paper; and a sending unit configured to send the first paper information held in the first holding unit to the image forming apparatus, wherein the image forming apparatus comprises:

a second holding unit configured to hold a second paper information including at least identification information identifying paper to be used in the image forming processing and processing condition information indicating a processing condition of when image forming processing is executed using the paper;

a receiving unit configured to receive the first paper information sent by the sending unit;

a control unit configured to control such that, when identification information contained in the first paper information and identification information contained in the second paper information are duplicated, duplicated identification information is changed and a third paper information in which the first paper information and the second paper information are merged is held in the second holding unit;

a selection unit configured to select paper to be used in the image forming apparatus based on identification information sent with image data by the image processing apparatus and the third paper information; and a printing unit configured to carry out image forming processing based on the image data according to the processing condition information corresponding to the paper selected by the selection unit.

14. The system according to claim 13, wherein the first holding unit obtains and holds the second paper information from the image forming apparatus with a predetermined timing, and the second holding unit obtains and holds the first paper information from the image processing apparatus with the predetermined timing.

15. The system according to claim 14, wherein the predetermined timing is a timing of at least one of a timing by which the image forming apparatus transitions to a sleep state, a timing by which the image forming apparatus executes an adjusting operation, a timing by which a power supply is stopped to the image processing apparatus or the image forming apparatus, and a timing by which a predetermined time interval has elapsed.

16. The system according to claim 13, further comprising a first update unit configured to update the second paper information of the image forming apparatus in response to an update of the first paper information by the image processing apparatus.

17. The system according to claim 13, further comprising a second update unit configured to update the first paper information of the image processing apparatus in response to an update of the second paper information by the image forming apparatus.

* * * * *